United States Patent [19]

Sato

[11] Patent Number: 4,747,071
[45] Date of Patent: May 24, 1988

[54] DATA TRANSFER APPARATUS AND SYSTEM

[75] Inventor: Yukio Sato, Tokyo, Japan

[73] Assignee: Canon Kabushiki Kaisha, Tokyo, Japan

[21] Appl. No.: 820,820

[22] Filed: Jan. 21, 1986

Related U.S. Application Data

[63] Continuation of Ser. No. 439,536, Nov. 5, 1982, abandoned.

[30] Foreign Application Priority Data

| Nov. 9, 1981 | [JP] | Japan | 56-178408 |
| Nov. 26, 1981 | [JP] | Japan | 56-188365 |
| Dec. 4, 1981 | [JP] | Japan | 56-194447 |
| Dec. 4, 1981 | [JP] | Japan | 56-194448 |
| Dec. 11, 1981 | [JP] | Japan | 56-198386 |

[51] Int. Cl.⁴ ............................................. G06F 9/00
[52] U.S. Cl. ...................................................... 364/900
[58] Field of Search ............................... 364/200, 900

[56] References Cited

U.S. PATENT DOCUMENTS

| 3,863,226 | 1/1975 | Ryburn | 364/200 |
| 4,020,472 | 4/1977 | Bennett et al. | 364/200 |
| 4,319,338 | 3/1982 | Grudowski et al. | 364/900 |
| 4,430,710 | 2/1984 | Catiller et al. | 364/200 |

Primary Examiner—Thomas M. Heckler
Assistant Examiner—John G. Mills
Attorney, Agent, or Firm—Fitzpatrick, Cella, Harper & Scinto

[57] ABSTRACT

A data transfer apparatus for exchanging data between a copying machine and an attachment device thereof is disclosed. The copying machine and the attachment device each includes a microcomputer having a program for parallel-to-serial data conversion, an output port for serially sending out the data from the microcomputer of its own to the microcomputer of other unit through a transmission line.

11 Claims, 26 Drawing Sheets

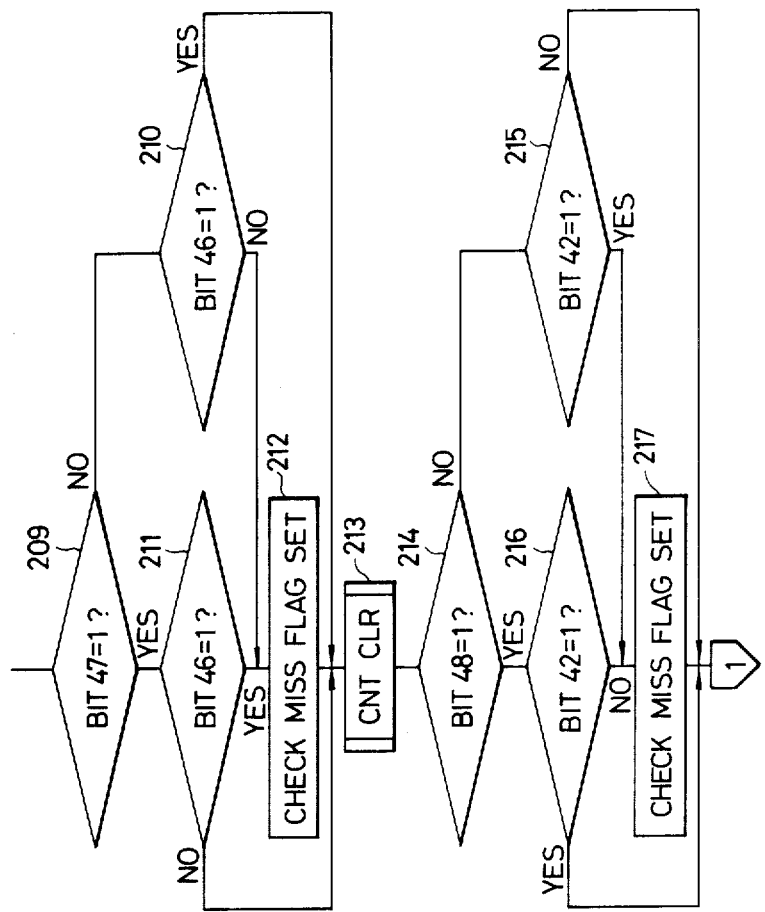

DATA TRANSFER APPARATUS AND SYSTEM

This application is a continuation of application Ser. No. 439,536, filed Nov. 5, 1982, now abandoned.

BACKGROUND OF THE INVENTION

1. Field of the Invention

The present invention relates to data transfer apparatus and system for exchanging data between a copying machine and an attachment device thereof.

2. Description of the Prior Art

In a copying machine which is intended to improve operability and finely control the quality of copy, a data transfer apparatus for exchanging various data (for example, data indicating copy enable and sorter enable) between the copying machine and an attachment device having a sorter and an input sensor is usually required. As shown in FIG. 1, in a prior art data transfer apparatus of this type, a copy machine 11 has a central processing unit (CPU) 12, an I/O controller 13, an output driver 14, an input interface 15, a CPU power supply circuit 16 and an attachment device power supply circuit 17, and mainly controls key entry and display. An attachment device 18 has a sequence controller 19, an input interface 20A, an output driver 21A, an output load 22A and an input sensor 23A, and controls a copy sequence and a sorter sequence. A flat cable, for example, having a number of lines determined depending on the number of various signals is used to transfer the data between the copying machine 11 and the attachment machine 18.

The input interface 15 of the copying machine 11 and the input interface 20A of the attachment device 18 may use photo-couplers as shown in FIG. 2 in order to suppress noises.

In any case, however, as the number of types of signals to be transferred increases, the number of pins of the connector increases. As a result, costs of the connector and the cable increase and the reliability of the apparatus is degraded.

The applicant of the present invention has proposed an apparatus for serially transferring data among CPU's in a copying machine having a plurality of CPU's. However, the proposed apparatus uses, in addition to an exclusive data line, a clock line for synchronizing the CPU's and a protocol line for communicating transfer enable of the CPU's. As a result, the number of lines increases.

Also, it is inconvenient because of a fixed master and slave relation.

SUMMARY OF THE INVENTION

It is an object of the present invention to provide data transfer apparatus and system which are free from the above disadvantages.

It is another object of the present invention to provide a data transfer apparatus and system having a reduced number of lines for transferring data among electronic units.

It is an other object of the present invention to provide a data transfer apparatus and system which facilitates the data transfer among units having computers.

It is an other object of the present invention to provide an image forming system which is effective when an image forming apparatus such as a copying machine and a attachment device thereof have micro- computers.

It is an other object of the present invention to provide a data transfer apparatus which properly handles an error in the data transfer.

It is still an other object of the present invention to provide a data transfer apparatus which allows each of a plurality of computers contributing to the data transfer to operate either as a master or as a slave computer.

It is still an other object of the present invention to provide a data transfer apparatus and system which requires no clock line.

It is an other object of the present invention to provide a data transfer apparatus which readily enables the data transfer to a distant place.

It is an other object of the present invention to provide a data transfer apparatus and system which can transfer data with a very small number of media.

The above and other objects of the present invention will be apparent from the following description of the invention.

BRIEF DESCRIPTION OF THE DRAWINGS

FIG. 3-1 shows a circuit diagram of an configuration of a main portion of a data transfer apparatus in accordance with the present invention, FIG. 3-2 shows a system diagram of the data transfer, FIGS. 7, 8, 9, 10, 11, 12, 13, 14, 15, 16, 17A, 17B, and 18 show flow charts of sub-routines.

DESCRIPTION OF THE PREFERRED EMBODIMENTS

Figure 1:
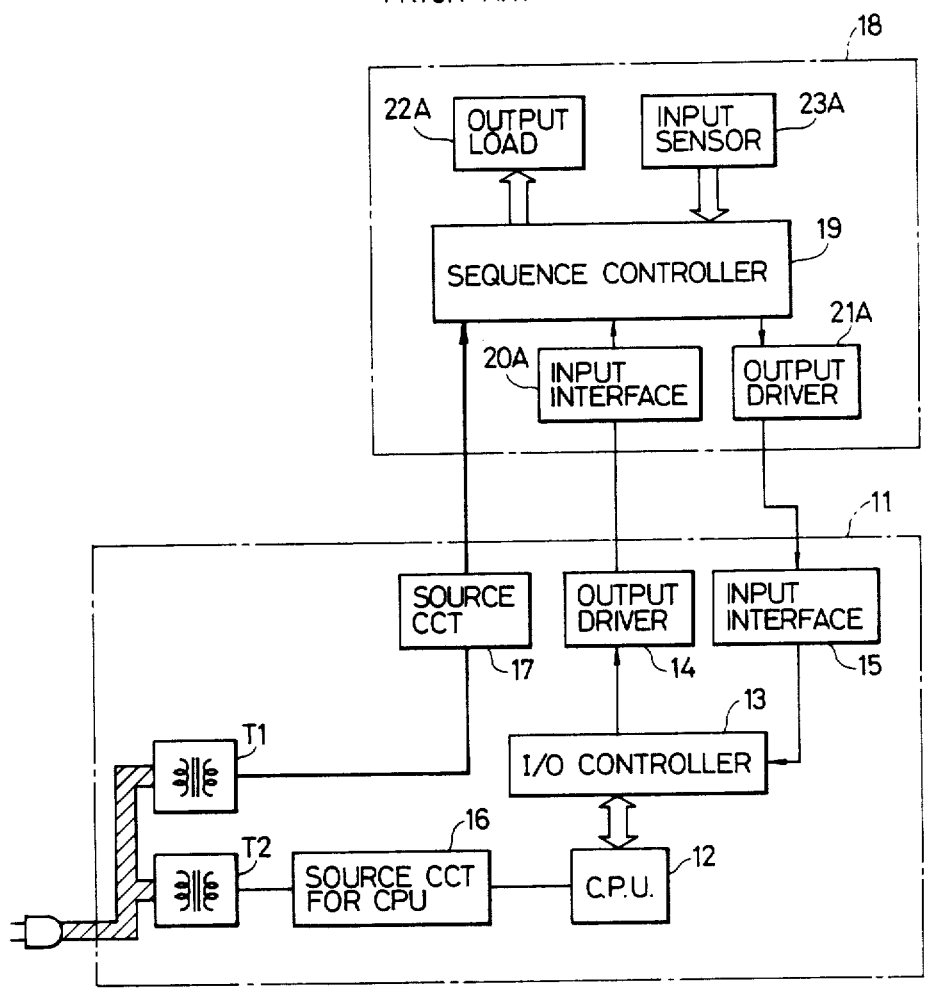
FIGS. 1 and 2 show block diagrams of prior art data transfer apparatus.
Figure 2:
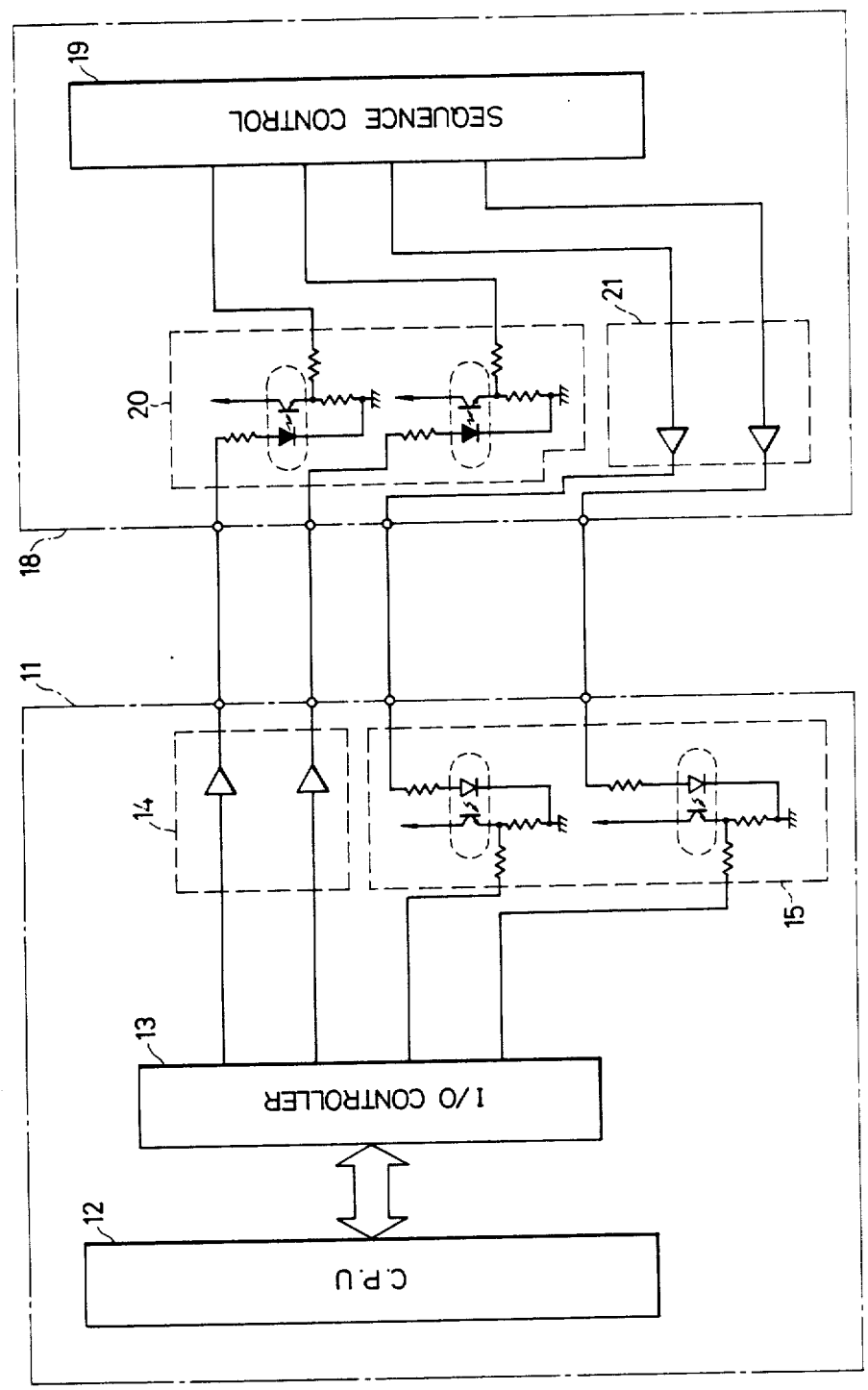
Figures 1, 3:
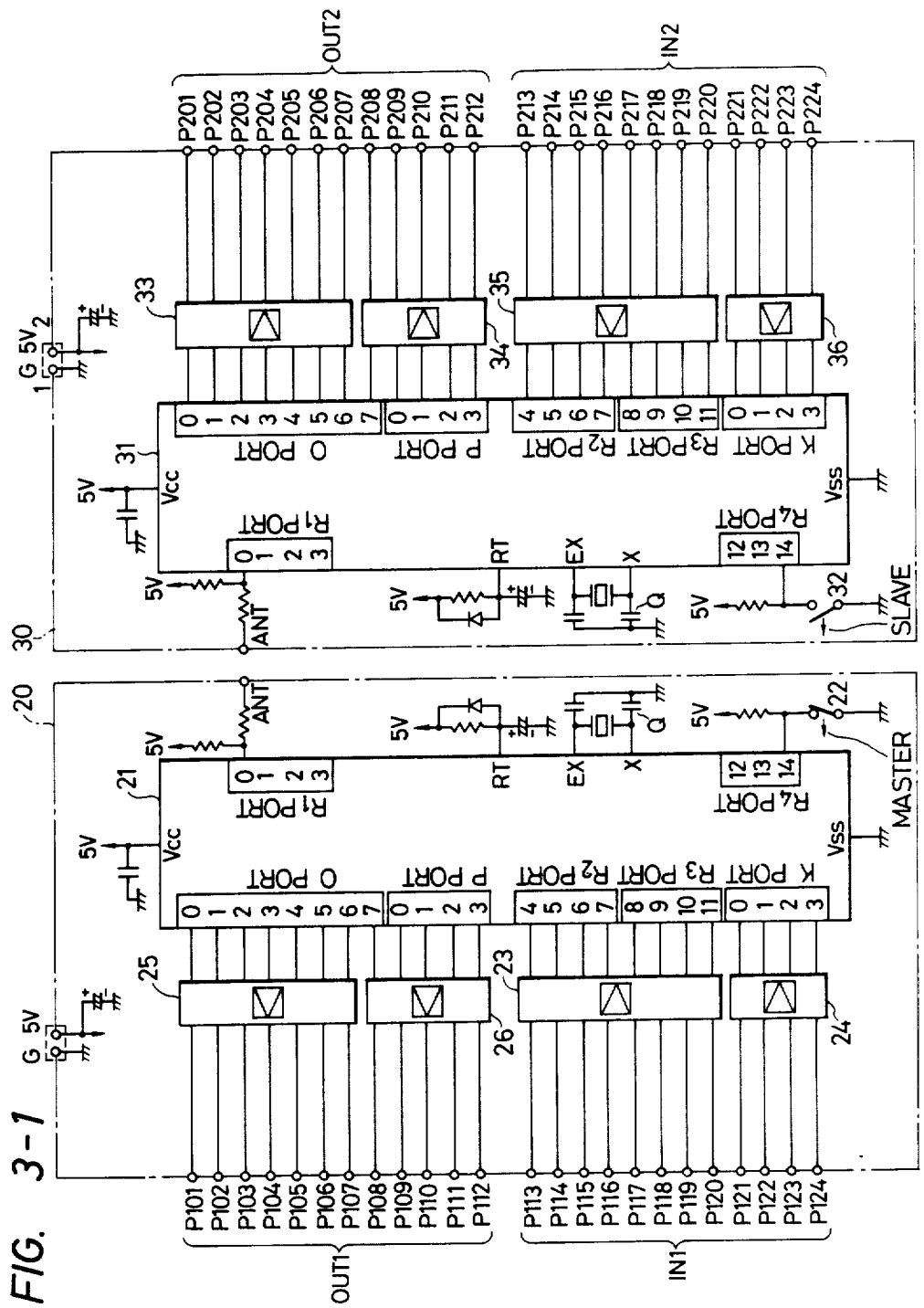
Figures 2, 3:
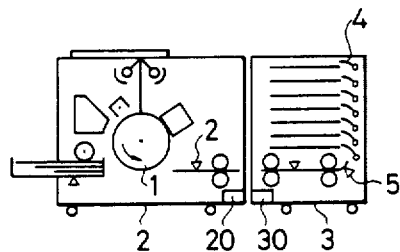

FIG. 3-1 shows a circuit diagram of a configuration of a main portion of the data transfer apparatus of the present invention. The data transfer apparatus is equipped with exchangeable transmitter/receivers 20 and 30 in a copying machine 2 and an attachment device 3 such as a sorter shown in FIG. 3-2. The transmitter/receivers 20 and 30 have microcomputers 21 and 31 and interface circuits therefor, respectively, packaged on printed circuit board. The copying machine 2 of FIG. 3-2 has a microcomputer controller which controls a copy sequence and is connected to terminals OUT1 and IN1 of the transmitter/receiver 20. The sorter 3 has a microcomputer controller which controls a sorter sequence and is connected to terminals OUT2 and IN2 of the transmitter/receiver 30. Alternatively, the computers 21 and 31 in the transmitter/receivers 20 and 30 may be constructed to control the copy sequence and the sorter sequence, respectively. In this case, a sequence load such as a motor of a drum 1 of the copying machine 2 is connected to the terminal OUT1, a sequence sensor such as a paper sensor 2 is connected to the terminal IN1, a load such as a drive plunger of a pawl 4 of a sorter 3 is connected to the terminal OUT2 and a sensor such as a jam sensor 5 is connected to the terminal IN2.

The copying machine 2 and the sorter 3 exchange control data such that the copying machine 2 operates when the sorter 3 is ready and the sorter 3 switches the operation when a predetermined number of copies has been made by the copying machine. For this purpose, a port R1-0 and a transmission line for coupling the transmitter/receivers 20 and 30 are provided. It comprises lines connected to antenna terminals ANT and a common ground line. Accordingly, the transmission line can be a single wire line. The port R1 is a common input-/output port.

The microcomputers 21 and 31 each has a function of serial-to-parallel and parallel-to-serial conversion of the data, and the selection of master/slave status is effected by switches 22 and 32 connected to the port R4. In the illustrated embodiment, the microcomputer 21 of the copying machine transmitter/receiver 20 is the master and the microcomputer 31 of the attachment device transmitter/receiver 30 is the slave. The microcomputers 21 and 31 each have a power supply terminal Vcc, a ground terminal Vss and control terminals RT, EX and X. When power is supplied to the power supply terminal Vcc, a reset signal is supplied to the control terminal RT to initialize the system. An oscillation resonator Q is connected to the control terminals EX and X and generates a clock pulse of 2 MHz, for example. The microcomputers 21 and 31 may be microprocessors having a ROM (read-only memory) and a RAM (random access memory) in one chip.

In the present data transfer apparatus, when data is supplied from the copying machine to the input terminal IN1 which comprises terminals P113–P114 of the master transmitter/receiver 20, the data is amplified by amplifiers 23 and 24 and the amplified data is read in by the microcomputer 21 through the terminals of the ports R2, R3 and K, where it is converted to serial data and it is transmitted to the slave transmitter/receiver 30 from the port R1 through the antenna terminal ANT. The transmitter/receiver 30 receives the serial data through the antenna terminal ANT and supplies it to the port R1 of the microcomputer 31. The microcomputer 31 reconverts the serial data to parallel data and supplies it to the amplifiers 33 and 34 through the terminals of the ports O and P. The amplifiers 33 and 34 amplify the parallel data and transfer the amplified data to the output terminal OUT2 which comprises terminals P201–P212.

Similarly, when the slave transmitter/receiver 30 transmits the data to the master transmitter/receiver 20, the attachment device can transfer the data applied to the input terminal IN2 which comprises terminals P213–P224 to the output terminal OUT1 which comprises terminals P101–P112 through the amplifiers 35 and 36, the microcomputer 31, the antenna terminal ANT, the microcomputer 21 and the amplifiers 25 and 26. In this case, the microcomputer 31 carries out the parallel-to-serial data conversion and the microcomputer 21 carries out the serial-to-parallel data conversion. In this manner, the transmitter/receivers 20 and 30 can transmit the data bilaterally.

Figure 4:
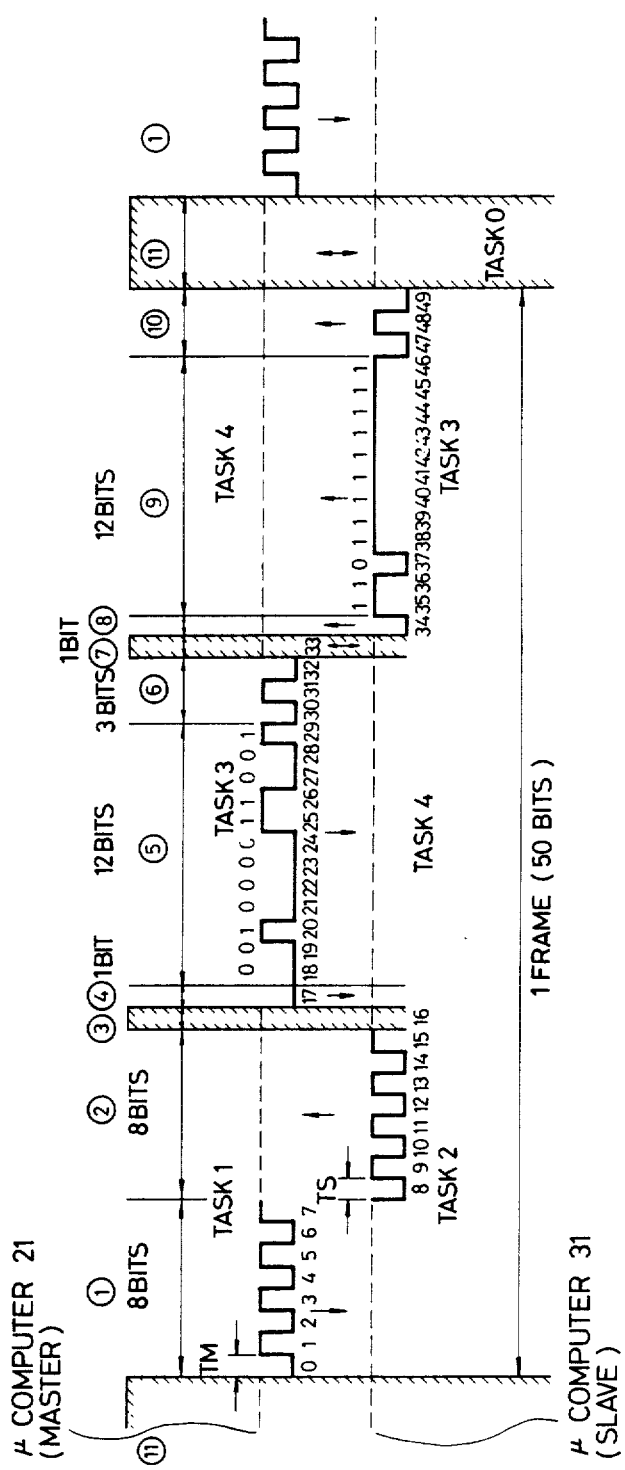
FIG. 4 shows signal waveforms for explaining a communication format.

FIG. 4 shows a signal waveform for explaining a communication format used in the data transfer apparatus of FIG. 3. The microcomputers 21 and 31 each execute eleven steps ①— ⑪ as shown to transfer one frame of data. In the steps ① and ②, the master microcomputer 21 and the slave microcomputer 31 carry out the synchronization control for transfer clock. The microcomputer 21 starts the step ① from the step ⑪ in which the transmission line is open, when a bit 0 of the frame changes from "1" to "0" and transmits an 8-bit transfer clock pulse having a period of TM to the microcomputer 31 as a TASK 1.

During this period, the microcomputer 31 starts a TASK 2 upon the rise of the bit 0 and measures the period TM of the transfer clock pulse sent from the master eight times (for bits 0–7) and calculates a mean transfer clock period TS, and sends it back to the master microcomputer 21 by bits 8–15 in the step ②. The microcomputer 21 checks if the transfer clock period TM is equal to the average period TS. If TM≠TS, the communication with the microcomputer 31 is not permitted and the microcomputer 21 changes the transmission line to "0" by the bit 16 in the step ③ to inform the microcomputer 31 of that fact. On the other hand, if TM=TS, the microcomputer 21 changes the bit 17 to "0" in the step ④ and starts the execution of a TASK 4. The microcomputer 21 starts to count the transfer clock from the bit 17 in the step ④.

In the next steps ⑤ and ⑥, the microcomputer 21 executes the TASK 3 and transfers the 12-bit serial data (bits 18–29) to the microcomputer 31 and then transfers a 3-bit check sequence of bits (bits 30–32) in the step ⑥. The bit 30 of the check bits may be even parity bit, but in the present embodiment a complement of the previous bit 29 is set. That is, "0" is set in order to clearly distinguish the bits 29 and 30. The bit 31 of the check bits is set depending on the content of the data. In the present embodiment, the value of the bit 25 which is the seventh bit of the 12-bit data, that is, "1", is set. The bit 32 of the check bits is "0" in order to represent the final bit. At the end of the bit 32, "1" is set and the transmission line is opened at the bit 33.

While the microcomputer 21 executes the TASK 3 in the steps ④-⑥, the microcomputer 31 executes the TASK 4 to read in the transferred data. In this manner, the microcomputer 21 converts the parallel data supplied to the terminals P113–P124 of the transmitter/receiver 20 to serial data, and sends it out to the transmission line through the antenna terminal ANT, and the microcomputer 31 receives the serial data, reconverts it to parallel data and supplies it to the terminals P201–P212 of the transmitter/receiver 30. Accordingly, the data supplied to the terminals P113–P124 of the input terminal IN1 of the transmitter/receiver 20 is distributed to the corresponding terminals P201–P212 of the output terminal OUT2 of the transmitter/receiver 30.

In the step ⑦, the microcomputers 21 and 31 switch the transmission/reception mode to prepare for the switching of the direction of the data transmission. In the step ⑧, the slave microcomputer 31 sets the bit 34 to "0" to start the data transmission and starts to count the transfer clock. Since the microcomputer 31 has already been synchronized with the transfer clock in the steps ① and ②, it can serially transmit the 12-bit serial data (bits 35–46) to the microcomputer 21 in the transfer clock period TM in the step ⑨.

In the step ⑩, the microcomputer 31 sends out the 3-bit check sequence of bits (bits 37–39) to the microcomputer 21 in a manner similar to the step ⑥. Thus, while the microcomputer 31 executes the TASK 3 to transmit the data, the microcomputer 21 executes the TASK 4 to receive the data. Accordingly, the data supplied to the terminals P213–P224 of the input terminal IN2 of the transmitter/receiver 30 can be supplied to the corresponding terminals P101–P112 of the output terminal OUT1 of the transmitter/receiver 20. In the step ⑪, both the microcomputers 21 and 31 open the transmission line and execute a TASK 0 in which the microcomputers wait for the start of the step ① for transferring the next data.

Figure 5:
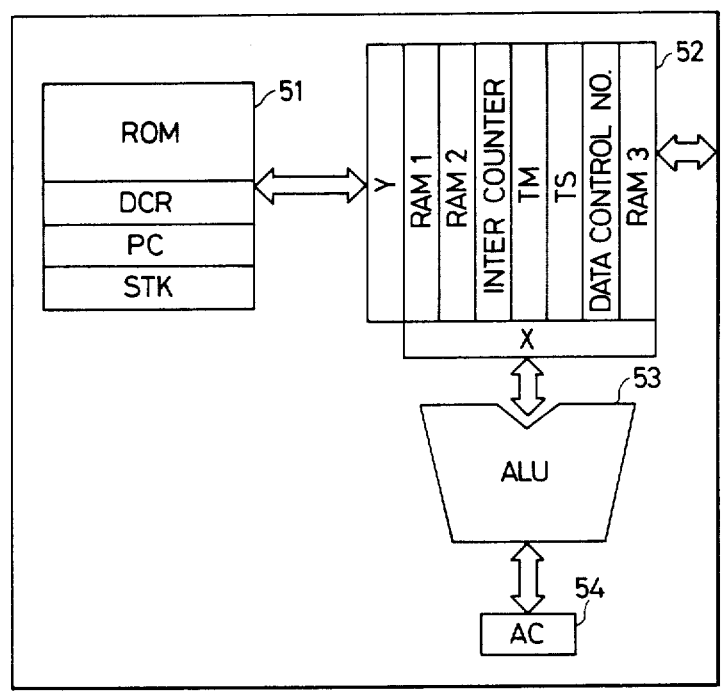
FIG. 5 shows a block diagram of a main portion of a microcomputer used in the present invention.

FIG. 5 shows a block diagram illustrating a configuration of a main portion of each of the microcomputers 21 and 31. The microcomputers 21 and 31 each have a control memory 51, a RAM (random access memory) 52, an arithmetic logic unit (ALU) 53 and an accumulator 54. A ROM (read-only memory) of the control memory 51 contains microinstructions and information necessary to control the data transfer clock period. A decoder DCR decodes data read out of the ROM and a program counter PC specifies a ROM address. A stack STK comprises a group of registers used in a LIFO (last-in first-out) fashion.

The RAM 52 has a plurality of memory areas the addresses of which are specified by X and Y address registers. A RAM 1 stores the data supplied to the input terminal IN1 or IN2 and a RAM 2 stores the data to be supplied to the output terminal OUT1 or OUT2. A RAM 3 has memory areas to store the serial input data transmitted from the other computer to the port R1 through the antenna terminal ANT. The RAM 52 further has an interrupt counter which is incremented by one when a timer interruption occurs, a memory area for storing the transfer clock period TM, a memory area for storing the measured transfer clock period TS and a memory area for storing input/output data control numbers.

Figure 6:
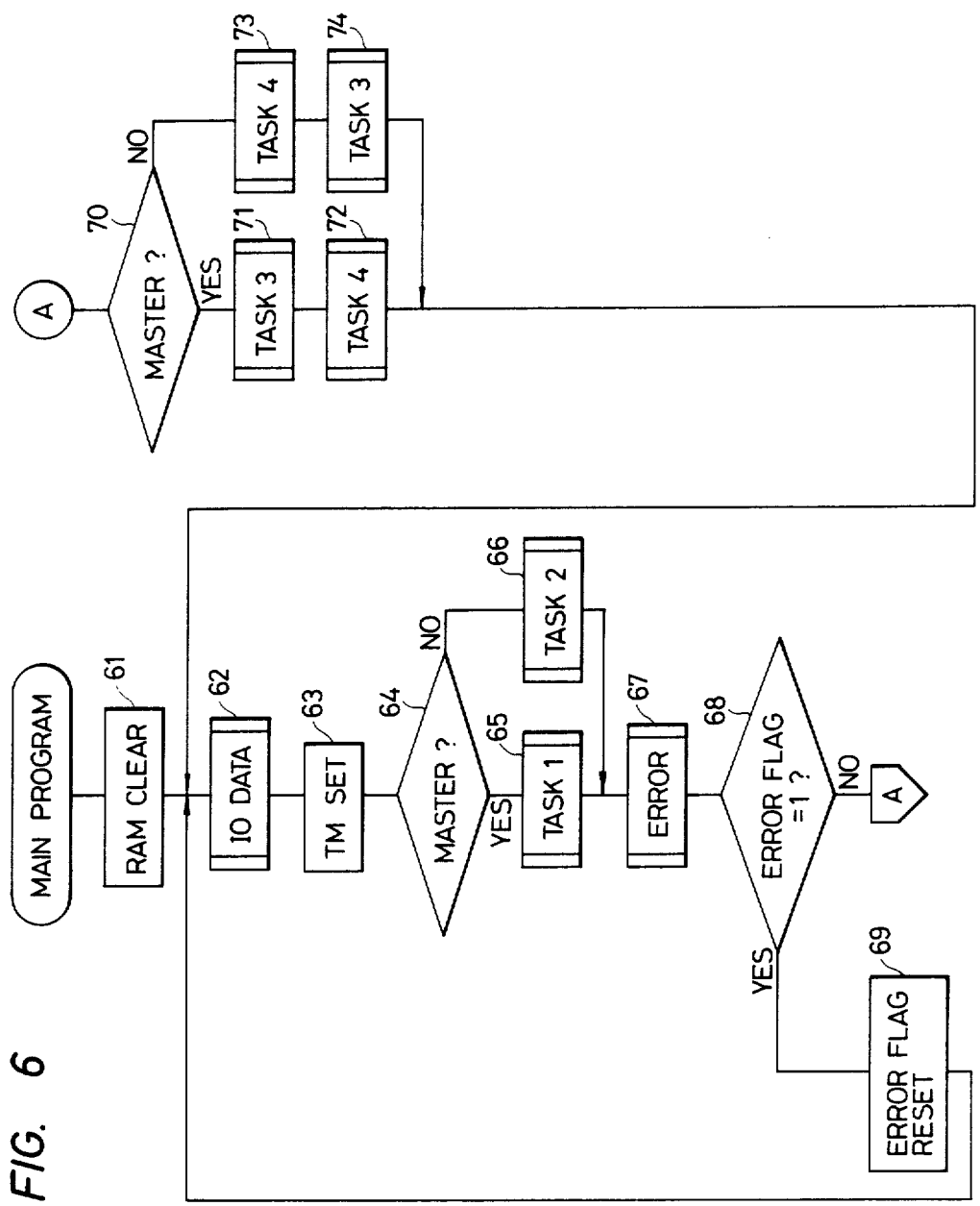
FIG. 6 shows a flow chart of a main program of the microcomputer.
Figure 7:
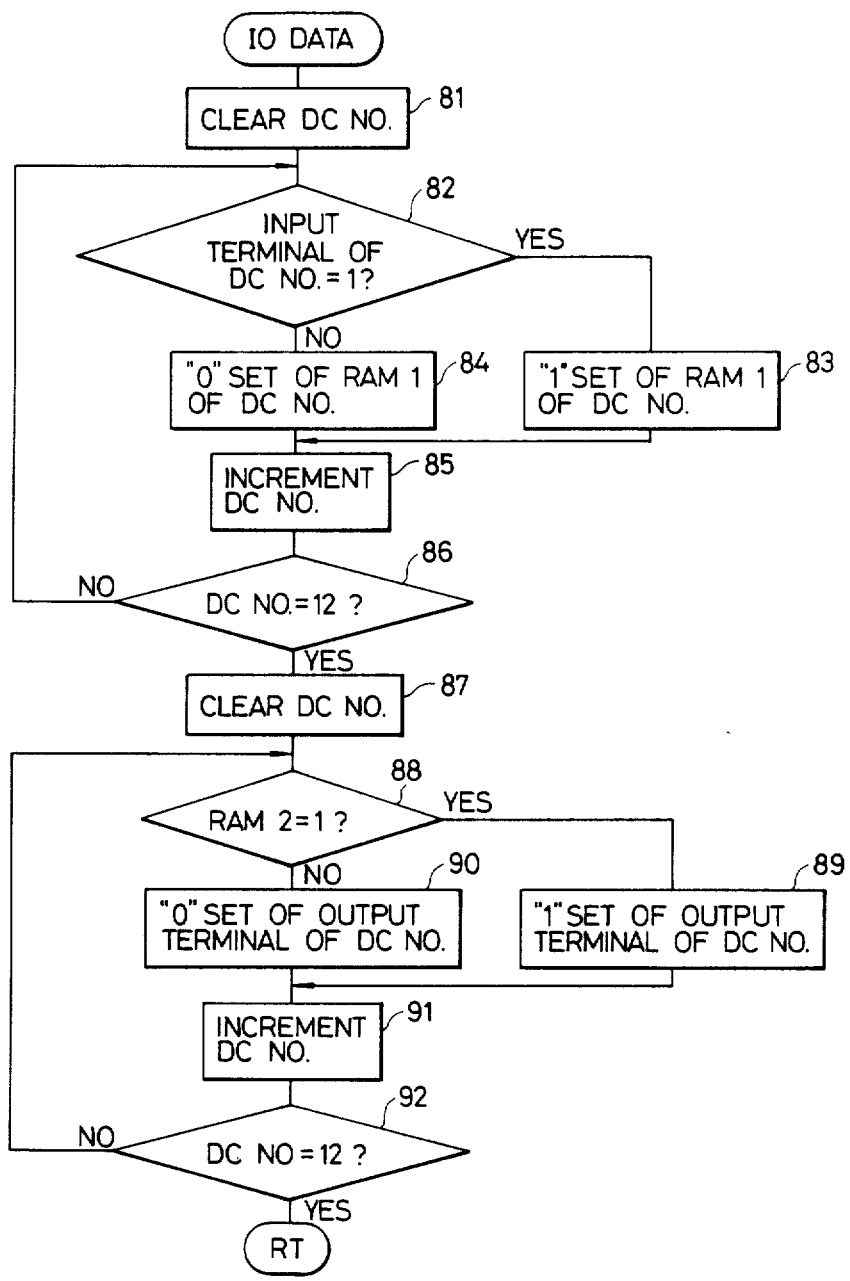

Referring to a flow chart of a main program shown in FIG. 6 and flow charts of sub-routines shown in FIGS. 7 to 18, the operation of the data transfer apparatus is now explained.

In the microcomputers 21 and 31, when a power is supplied and the initialization is carried out by a reset signal, the main program shown in FIG. 6 is started. First, in a step 61, the RAM is cleared, and in the next step 62, a sub-routine "IO DATA" is executed. In the sub-routine "IO DATA", the microcomputers 21 and 31 read in the input information supplied to the input terminals IN1 and IN2 to the RAM 1 and supply the output information read from the RAM 2 to the output terminals OUT1 and OUT2, respectively. In a step 63, the transfer clock period TM is set to the RAM and the interrupt counter is started. As described above, the transfer clock period TM is stored in the ROM and it determines the serial transfer rate of the data. The interrupt counter is incremented by one each time when a timer interruption occurs.

In a step 64, it is checked whether the microcomputers 21 and 31 are master or slave. This is checked by checking if the ports R4–R14 are set or not. In the present embodiment, the microcomputer 21 is the master and the microcomputer 31 is the slave. In a step 65, a sub-routine "TASK 1" is executed and in a step 66 a sub-routine "TASK 2" is executed. Accordingly, the microcomputer 21 sends out the transfer clock pulse to the transfer line by the bits 0–7 in the period TM, and the microcomputer 31 measures the transfer clock period (see step ① of FIG. 4). Then, based on the transfer clock period TS measured by the microcomputer 31, the microcomputer 31 sends back the transfer clock pulse for the period of the bits 8–15 and the microcomputer 21 receives the transfer clock (see step ② of FIG. 4).

In this manner, the microcomputers 21 and 31 carry out the synchronization control of the transfer clock period, and if the clock period TM≠TS, the mutual communication is permitted. The decision is made in a sub-routine "ERROR" of a step 67. If the clock period TM≠TS, "1" is set to an error flag register. Whether the error flag is "1" or not is determined by the microcomputer 21 in a step 68. If the error flag is "1", the error flag register is reset in a step 69 and the program goes back to the step 62. If the error flag is "0", the control is shifted to a step 70.

If the error flag is "1", the master microcomputer 21 falls the transmission line to "0" to inform it to the slave microcomputer 31 as shown in the step ③ of FIG. 4. When an error occurs in the microcomputer 31 and the transfer clock period cannot be measured, it is also detected in the sub-routine "ERROR" and the error flag register is set to "1" and the transmission line is fallen to "0".

In the step 70, it is again checked whether the microcomputers 21 and 31 are master or slave, and the master microcomputer 21 sequentially executes sub-routines "TASK 3" and "TASK 4" in steps 71 and 72 while the slave microcomputer 31 sequentially executes the sub-routines "TASK 4" and "TASK 3" in the steps 73 and 74. More specifically, the microcomputer 21 first sets the transmission line to "0" in the step ④ of FIG. 4, then carries out the steps ⑤ and ⑥ of FIG. 4, transfers the 12-bit serial data by the bits 18–29 and transfers the 3-bit check sequence of bits by the bits 30–32. On the other hand, the microcomputer 31 enters into the data reception operation in the step ④ and reads in the 12-bit serial data and the 3-bit check sequence of bits in the steps ⑤ and ⑥.

In this manner, the microcomputer 21 executes the sub-routine "TASK 3" and the microcomputer 31 executes the sub-routine "TASK 4".

After the transmission line has been opened in the step ⑦ of FIG. 4, the microcomputer 31 now executes the sub-routine "TASK 3" of the steps ⑧ - ⑩ including the data transmission for the period of the bits 34–49 while the microcomputer 21 executes the sub-routine "TASK 4". When the microcomputers 21 and 31 complete the sub-routines "TASK 4" and "TASK 3" in the steps 72 and 74, respectively, the control is shifted to the step 62 for transferring the next data.

The steps of the main program have thus been explained. The sub-routines are now explained in sequence.

In the sub-routine "IO DATA", the microcomputers 21 and 31 read in the input data to the RAM 1 in accordance with the data control numbers 0–11 and read out the output data from the RAM 2. As shown in the flow chart of FIG. 7, when the sub-routine "IO DATA" is called, the data control numbers are cleared in a step 81, the input data is read into the RAM 1 in steps 82–86, the data control numbers are again cleared in a step 87 and the output data is read out of the RAM 2 in steps 88–92. In the step 82, the input data is checked in accordance with the data control numbers 0–11 assigned to the input terminals P113–P124 of the copying machine transmitter/receiver 20 (FIG. 3-1). Depending on whether the data at the input terminal P113 of the data control number 0, for example, is "1" or "0", the process branches to a step 83 or 84 and the input data is written into the location of the RAM 1 corresponding to the data control number 0.

In a step 85, the data control number is incremented by one. Since the data control number changes from 0 to 1, the result of check in a step 86 to check if the data control number is 12 or not is "NO" and hence the control is returned to the step 82. Similarly, the input data is read into the RAM 1 in accordance with the data control number, and when the data control number reaches 12, the result of check in the step 86 is "YES" and hence the control is shifted to a step 87. In steps 88–92, the output data read out of the RAM 2 in accordance with the data control number is distributed to the output terminals P101–P112 of the transmitter/receiver 20. The control thereof is essentially the same as that in the steps 82–86 and hence the explanation thereof is omitted.

Figure 8:
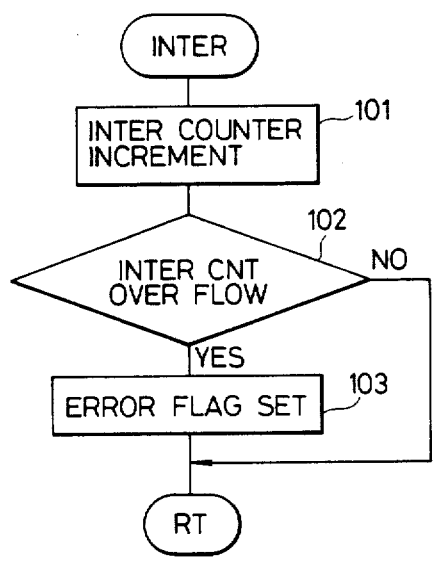

As described above, in the step 63 of the main program, the transfer clock period TM is set in the RAM and the interrupt counter is enabled. When the timer interruption occurs, the interrupt routine of FIG. 8 is called and steps 101–103 are executed. Thus, for each interrupt, the content of the interrupt counter is incremented, and if the interrupt counter overflows, that is, if the transmission rate of other microcomputer is different from that of its own, the error flag register is set.

The microcomputer 21 executes the sub-routine "TASK 1" in the step 65 of the main program. FIGS. 9 to 12 show flow charts of the sub-routine "TASK 1". By executing the sub-routine "TASK 1", the microcomputer 21 sends out the transfer clock pulse of the period TM which is the repetition of "0" and "1" to the transmission line through the antenna terminal ANT and the measures the period TS of the transfer clock pulse sent back from the microcomputer 31. The 8-bit transfer clock pulse (bits 0–7) is generated by alternately setting the antenna terminal ANT and executing a sub-routine "CNT CLR" in the steps 104–120.

Figure 10:
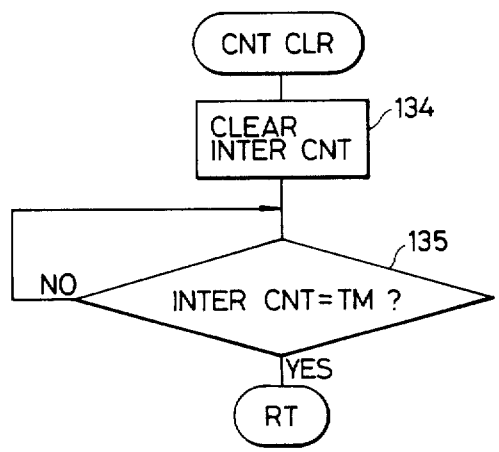
Figure 9:
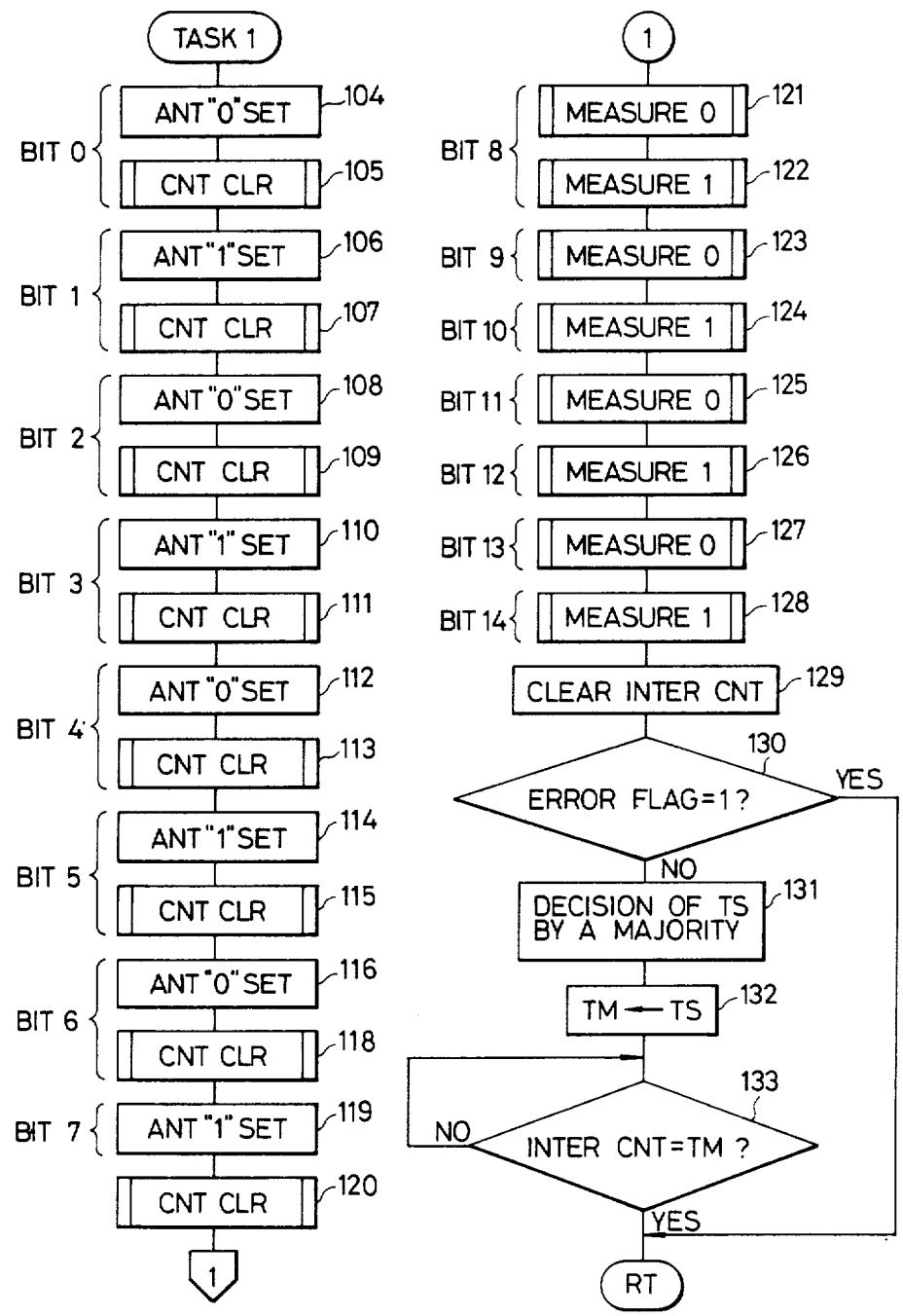

As shown in FIG. 10, the sub-routine "CNT CLR" comprises steps 134 and 135, and clears the interrupt counter and checks the coincidence of the content of the interrupt counter and the period TM (set in the RAM) to generate the pulse of the constant transfer clock period TM.

In steps 121–128 of the sub-routine "TASK 1", the master microprocessor 21 executes a sub-routine "MEASURE 0" and "MEASURE 1" alternately to measure the period TS of the 8-bit transfer clock pulse sent back from the slave microprocessor 31.

Figure 11:
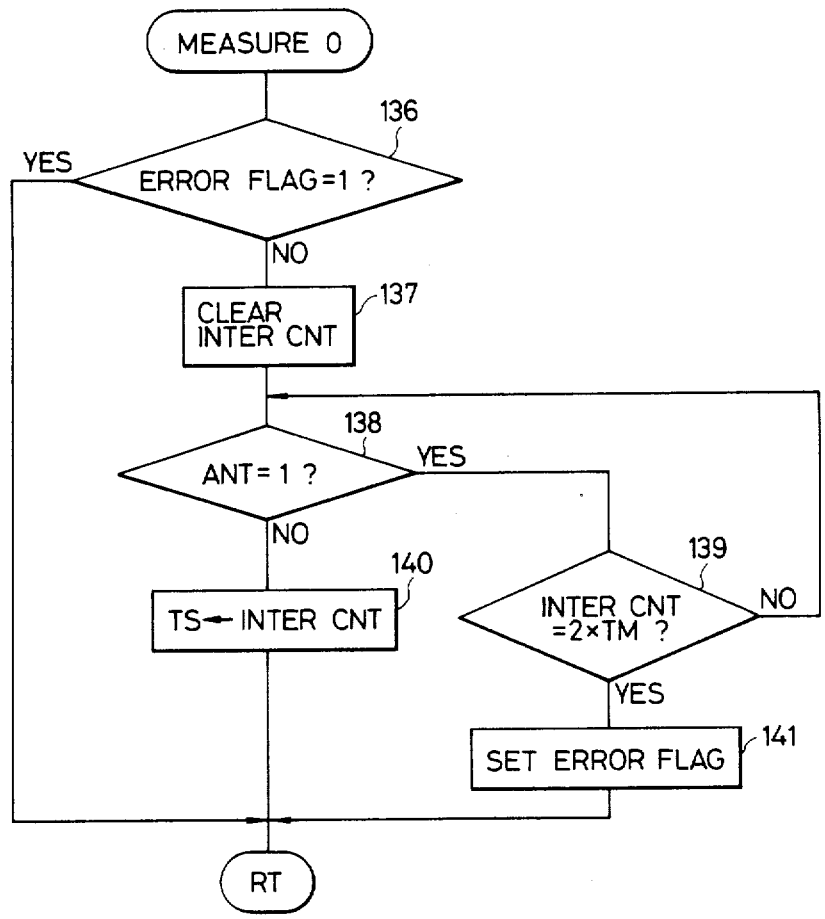

FIG. 11 shows a flow chart of the sub-routine "MEASURE 0". In a step 136, the content of the error flag register is checked, and if it is "1" the control is returned, and if it is "0", the interrupt counter is cleared in a step 137. In a step 138, it is checked if "1" has been transmitted to the antenna terminal ANT. Since the format is constructed such that the antenna terminal ANT is "1", the process then goes to a step 139 in which it is checked if the content of the interrupt counter 140 is twice of the transfer clock period TM. The decision in the step 139 is normally "NO" and the process goes back to the step 138. In this manner, the process is looped such that step 138→step 139→step 138→step 139 . . . are repeated. However, when the antenna terminal ANT falls to "0" at a certain time point, the process goes from the step 138 to the step 139 in which the content of the interrupt counter is stored in the corresponding area of the RAM as the measured clock period TS so that the period from "1" to "0" of the antenna terminal ANT, that is, the period TS in which the antenna terminal ANT is "1" is measured.

During the looping of the step 138→step 139→step 138→step 139 . . . , the interrupt routine is asynchronously carried out and the interrupt counter 140 is incremented for each interrupt. However, if the antenna terminal ANT does not fall to "0", the count of the interrupt counter 140 eventually reaches a count of TMX2. It indicates a failure of communication and the process goes from the step 139 to a step 141 in which the error flag is set to the error flag register and the process is returned. However, for the measurement of the bit 8, the result of measurement is not adopted because it merely detects the fall from "1" to "0" of the antenna terminal ANT.

Figure 12:
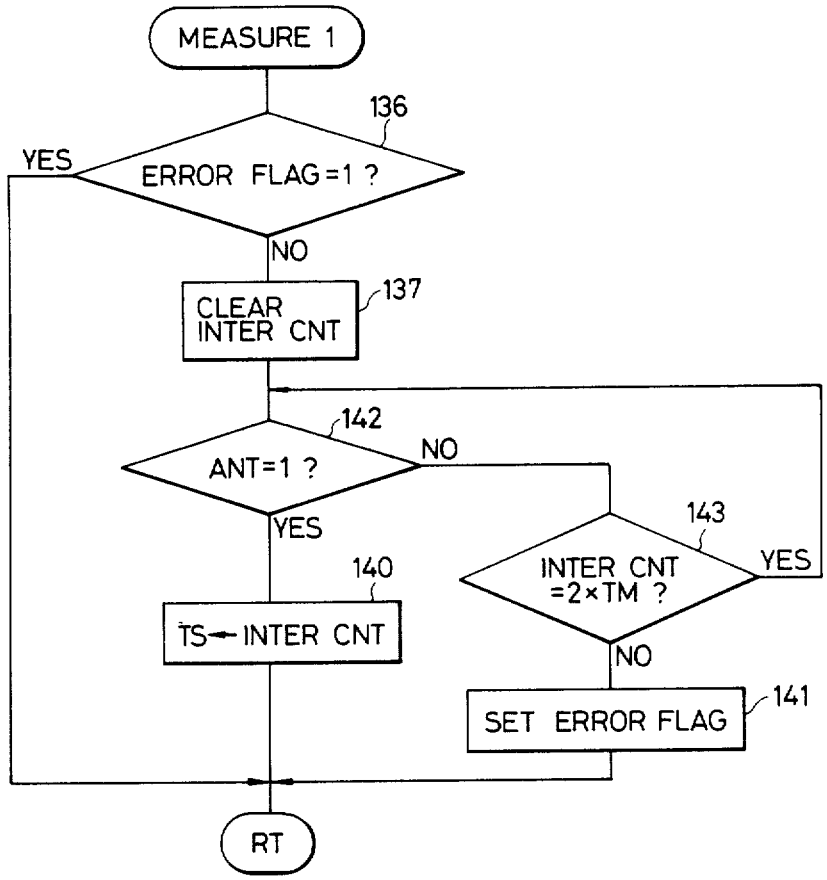

As shown in FIG. 12, the sub-routine "MEASURE 1" is similar to the sub-routine "MEASURE 0" except that the branch condition for steps 142 and 143 is opposite.

Thus, when the 8-bit sent-back clock period (bits 8–14) has been measured, the interrupt counter is cleared in the step 129 of the sub-routine "TASK 1" and the error flag register is checked again in the next step 130. If the content of the error flag register is "1", the control is returned to the main program, and if the content is "0", the control is shifted to the step 131, in which a mean value of the measured clock periods TS in calculated. In the present embodiment the mean value of the measured clock periods TS is approximated by a majority rule. In the step 132, the transfer clock TM stored in the RAM is updated. In the step 133, the content of the interrupt counter is compared with the transfer clock period TM and the counting of the interrupt counter is continued until they coincide, when the control is returned to the main program.

Figure 13:
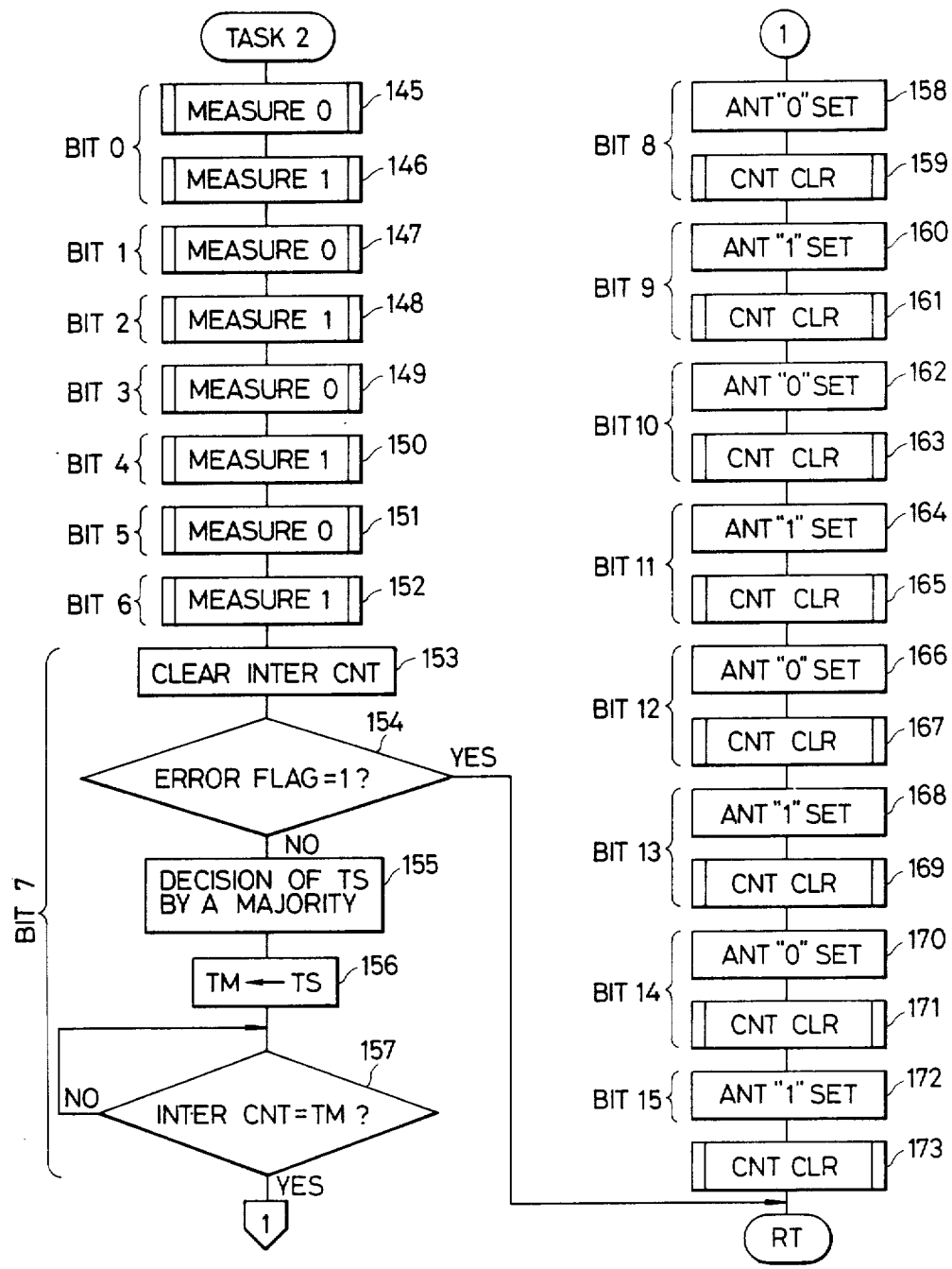

In parallel with the sub-routine "TASK 1", the slave microcomputer 31 executes the sub-routine "TASK 2". FIG. 13 shows a flow chart thereof. Steps 145–157 for measuring the period TM of the transfer clock pulse sent from the master and processing the measured periods are essentially identical to the steps 121–133 of the sub-routine "TASK 1", and steps 158–173 for sending back the clock pulse to the master based on the measured transfer clock pulse period are essentially identical to the steps 104–120 of the sub-routine "TASK 1". For the transfer clock period TM of the bit 0, however, the measured period is meaningless because it merely detects the fall of the antenna terminal ANT. After the transfer clock period TM of the bit 6 has been measured, the bit 7 is "1" and the interrupt counter is cleared in the step 153 at the rise of the bit 7. Accordingly, the transfer clock periods TM are measured for the period of the bits 0–6 and the steps 153–157 are carried out for the period of the bit 7.

The sub-routines "MEASURE 0" and "MEASURE 1" in the steps 145–152 comprise the steps shown in the flow charts of FIGS. 11 and 12, and the sub-routine "CTR CLR" in the steps 158–173 comprises the steps shown in the flow chart of FIG. 10.

Figure 14:
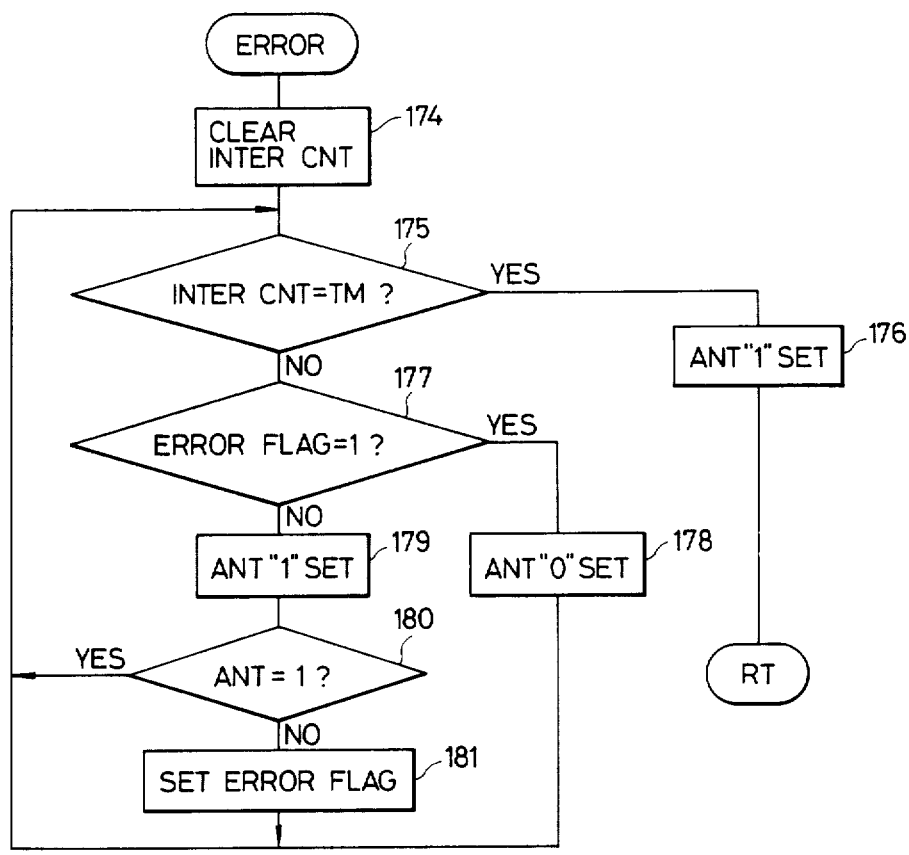

FIG. 14 shows a flow chart of the sub-routine "ERROR" of the step 67 in the main program. The sub-routine "ERROR" is executed after the microcomputers 21 and 31 have completed the execution of the "TASK 1" and "TASK 2", respectively and it is a routine for determining a value of the bit 16 of the communication format (step ④ of FIG. 4). Referring to the flow chart of FIG. 14, the interrupt counter is cleared in a step 174, the content of the interrupt counter is compared with the transfer clock period TM in a step 175, and if they are equal, "1" is set to the antenna terminal ANT in a step 176 to indicate that the transfer clock has been synchronized. On the other hand, if they are not equal, it is checked in a step 177 if the error flag register has been set to "1". If it is "1", "0" is set to the antenna terminal ANT in a step 178 and the control is returned to the step 175. On the other hand, if the error flag is "0", "1" is set to the antenna terminal ANT in a step 179, and it is checked in a step 180 if the antenna terminal ANT is "1" or not. The reason for this check is because the antenna terminal ANT can be set to "0" any time in order to indicate an error in the master or the slave and hence it is necessary to check it.

If the antenna terminal ANT is "1" in the step 180, the control is shifted to the step 175, and if it is not "1", the error flag register is set to "1" in a step 181 and the control is returned to the step 175. In this manner, in the sub-routine "ERROR", it is checked if the error flag register has been set in the sub-routines "TASK 1" and "TASK 2", and if the error flag has been set to "1", "0" is set to the antenna terminal ANT. If, the error flag has not been set to "1", an error in the transmission by other station is detected and if the antenna terminal ANT has been set to "0" by the error in the other station, the error flag register is set to "1", and when the content of the interrupt counter coincides with the transfer clock period TM at the end of the bit 16, "1" is set to the antenna terminal ANT and the control is returned to the main program.

Figure 15:
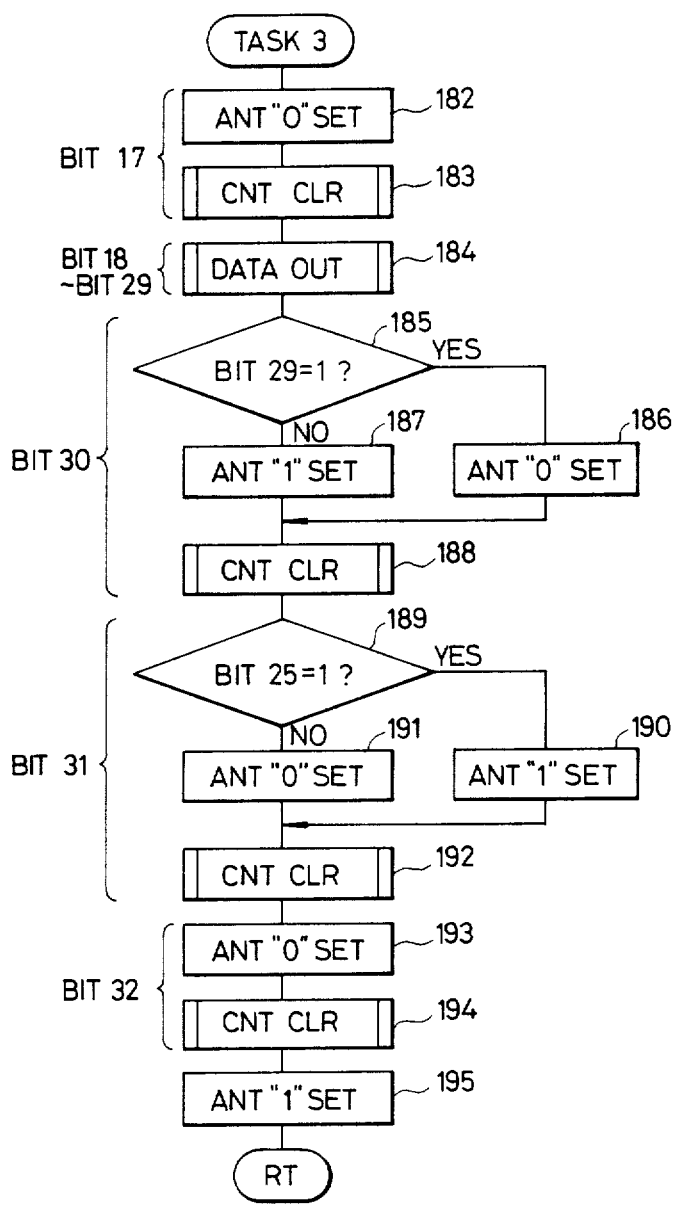
Figure 16:
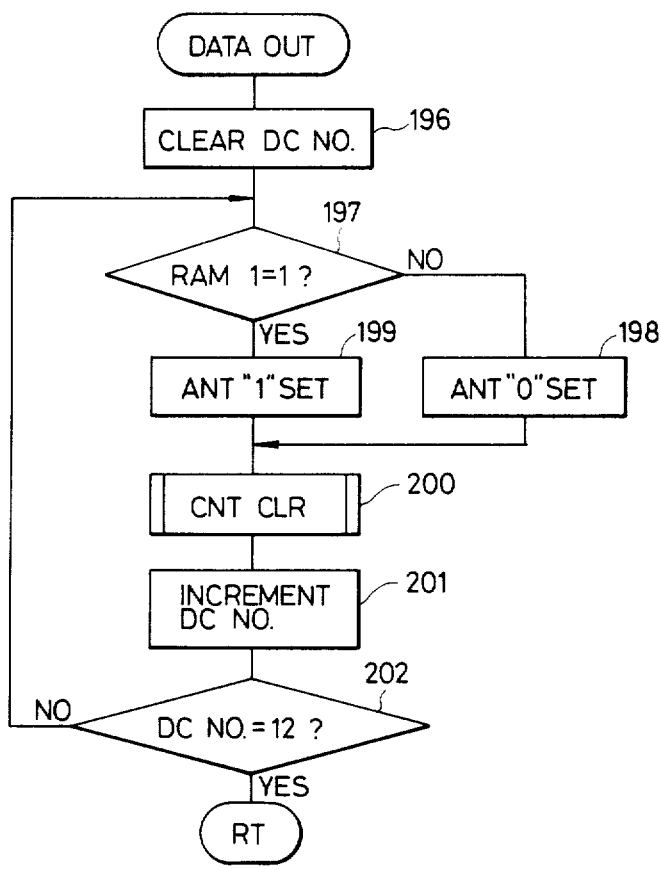

FIGS. 15 and 16 show flow charts of the sub-routine "TASK 3" of the step 71 in the main program. In the sub-routine "TASK 3", the master microcomputer 21 transfers the data to the slave microcomputer 31. Referring to the flow chart of FIG. 15, in steps 182 and 183, the antenna terminal ANT is reset to "0" and the sub-routine "CTN CLR" is executed and "0" of the bit 17 is sent out. In a step 184, the 12-bit data (bits 18-29) is transferred. FIG. 16 shows a flow chart of a sub-routine "DATA OUT". Since the data to be transferred has been stored in the RAM 1 in the step 62 of the main program, the readout of the data and the serial transfer of the data are carried out in the sub-routine "DATA OUT" in accordance with the data control number. As shown in FIG. 16, in a step 196, the data control number is cleared, and in steps 197-199, the data stored in the location of the RAM 1 corresponding to the specified data control number is read out and "0" or "1" is set to the antenna terminal ANT depending on whether the data is "0" or "1".

The control for an assigned one-bit period is carried out by the sub-routine "CNT CLR" in a step 200 (see FIG. 10), and the data control number is incremented in a step 201. After the data corresponding to the data control numbers 0-11 have been transferred, it is detected in a step 202 and the execution of the sub-routine "DATA OUT" is terminated and the control is shifted to a step 185 of the sub-routine "TASK 3". As described above, the check bits comprise three bits, the bits 30-32 and step 185-188 determine the value of the first bit or the bit 30 of the check bits. In the step 185, it is checked if the check bit 29 is "1" or not, and if it is "1" the antenna terminal ANT is set to "0" in the step 186, and if it is "0", the antenna terminal ANT is set to "1" in the step 187. The sub-routine "CNT CLR" in the step 188 controls the one bit transfer period as the step 184 does.

Steps 189-192 for the second bit of the check bits are essentially identical to the steps 185-188 and the value of the bit 25 is directly set to the bit 31. In a step 193, the antenna terminal is set to "0", and in a step 194, the sub-routine "CNT CLR" is executed and the third bit or the bit 32 of the check bits is sent out to the transmission line. In a final step 195 of the sub-routine "TASK 3", the antenna terminal ANT is set to "1".

Figure 17A:
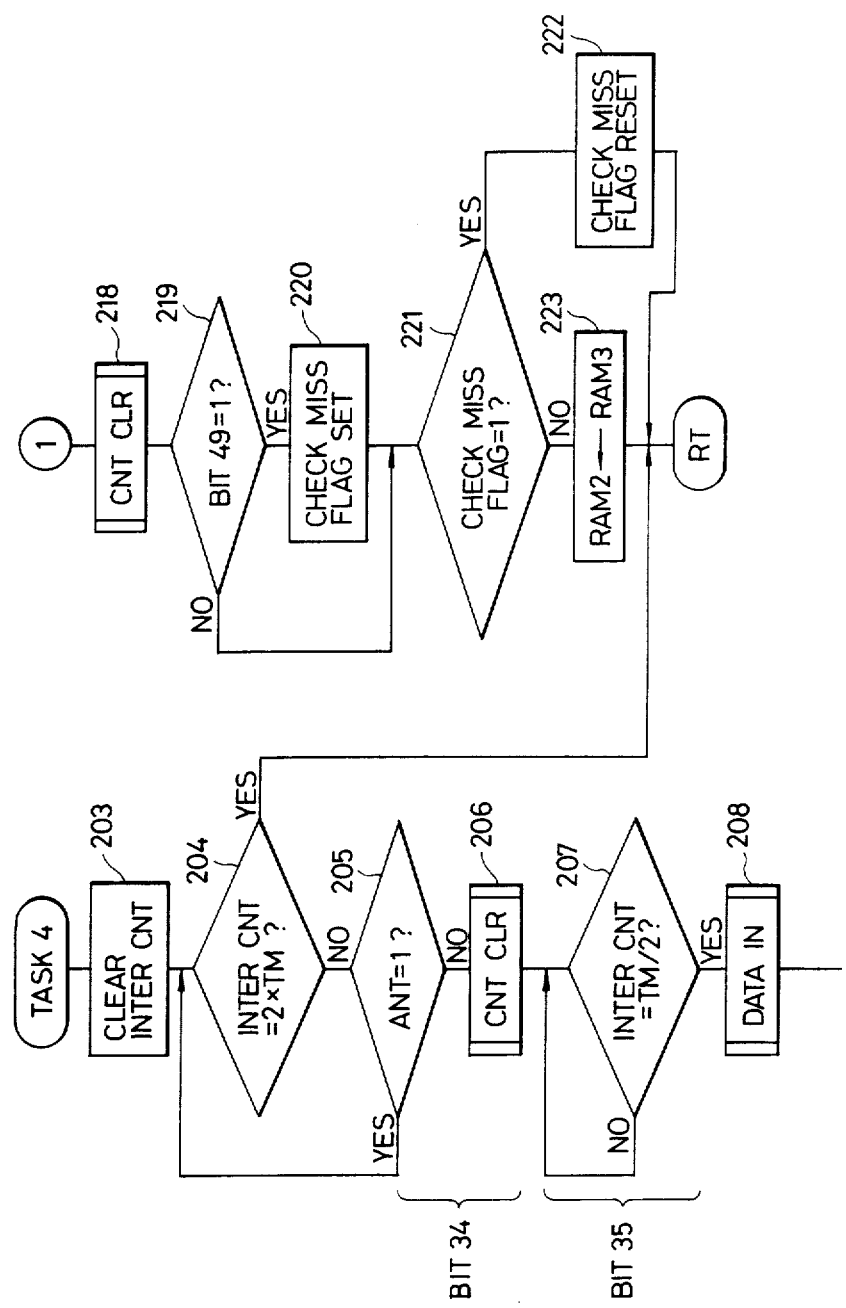
Figure 18:
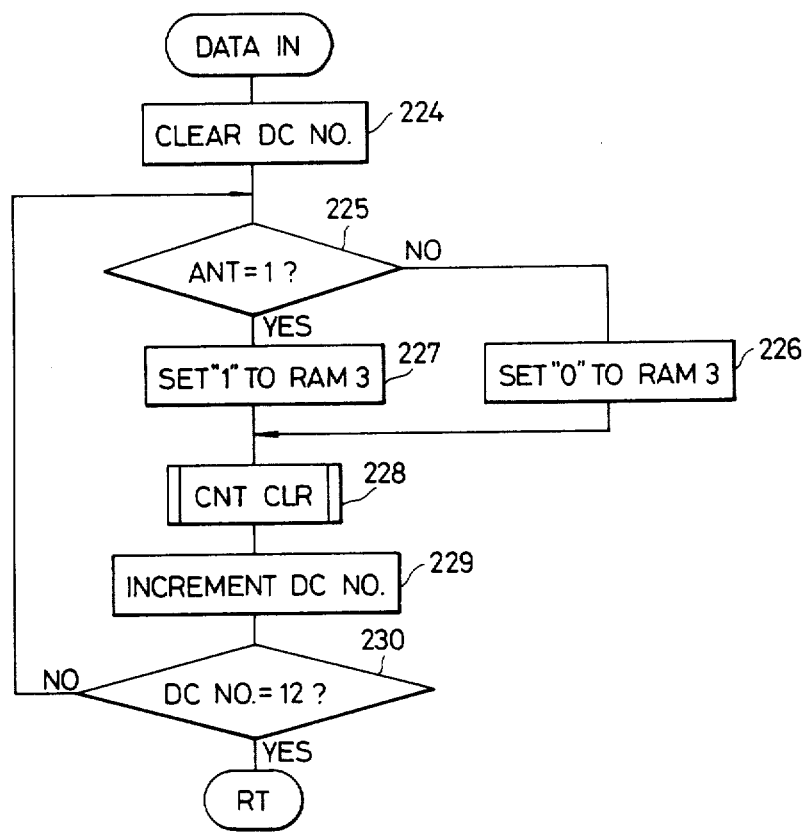

FIGS. 17A, 17B, and 18 show flow charts of the sub-routine "TASK 4" in the step 72 of the main program. In the sub-routine "TASK 4", the serial data transmitted from the slave is received and stored in the RAM 3, a transmission error in the data is checked, and if the error is not detected, the data stored in the RAM 3 is transferred to the RAM 2 to send out the data from the terminal OUT1 or OUT2.

Referring to the flow chart of FIG. 17, the interrupt counter is cleared in a step 203, and in steps 204 and 205 it is checked if the content of the interrupt counter is equal to double of the transfer clock period TM and if the antenna terminal ANT is "1" or not. If the slave does not start the data transfer when the content of the interrupt counter reaches the double of the transfer clock period TM, that is, if the antenna terminal ANT does not fall to "0", the master microcomputer 21 does nothing and returns the control to the main program. In this manner, when the data is not transmitted from the slave, the transfer of the input data from the RAM 3 to the RAM 2 is not carried out.

In a step 205, when "0" at the antenna terminal ANT is detected, the transfer cycle is started and the sub-routine "CNT CLR" is executed in a step 206. After the period of the bit 34 has been elapsed, the transferred data is read in. In order to sample the data at the mid-point of the transfer clock period TM, the timing therefore is adjusted in a step 207, and the sub-routine "DATA IN" is executed in a step 208. The sub-routine "DATA IN" comprises steps 224-230 for reading in the input data to the RAM 3 in accordance with the data control number.

In the step 224, the data control number is cleared, and in the steps 225-227, the data transferred to the antenna terminal ANT is stored in the location of the RAM 3 specified by the data control number. In the step 228, the sub-routine "CNT CLR" is executed to control the period corresponding to the transfer clock period TS. In the step 229, the data control number is incremented by one. In the step 230, it is checked if the data control number has reached 12, and if it has not, the control is returned to the step 225, and if it has reached 12, the control is shifted to the sub-routine "TASK 4".

In the sub-routine "TASK 4", the data is sampled at the mid-point of the bit 47 (see FIG. 4). The bit 47 is the first bit of the 3-bit check bits and the value thereof is a complement of the bit 46. In the steps 209-213, this relation is checked. If the bit 47 is "0" in the step 209, it is checked in the step 210 if the bit 46 is "1" or not. If the bit 46 is "0", it is not in a complementary relation to the bit 47 and a check miss flag register is set in the step 212 and the control is shifted to the sub-routine "CNT CLR" of the step 213. On the other hand, if the bit 46 is "1", the control is shifted to the step 213. When the bit 47 is "1" and the bit 46 is "1", it is detected in the steps 209 and 211 and the flag register is set. If the bit 47 is "1" and the bit 46 is "0", the control is shifted from the steps 209 and 211 to the step 213.

In the steps 214-218, it is checked if the second bit or the bit 48 of the check bits is equal to the bit 42 or not. In the step 219, it is checked if the third bit or the bit 49 of the check bits is "1" or not, and if it is "1", the check miss flag register is set in the step 220, and if it is "0", the control is shifted to the step 221. Finally, in the step 221, it is checked if the content of the check miss flag register is "1" or not to check any error in the data transfer. If the content of the check miss register is not "1", the data is the RAM 3 is written into the RAM 2, and if it is "1", the check miss flag register is reset and the control is returned to the main program and the data in the RAM 3 is not written into the RAM 2. Thus, in case of error, new data is not sent out of the terminal OUT1 and OUT2 but the data previously stored in the RAM 3 (serial data in the previous frame) is sent out.

The master sub-routines "TASK 3" and "TASK 4" have been explained thus far with reference to FIGS. 15 and 18. The slave sub-routines "TASK 4" (step 73 of the main program) and "TASK 3" (step 74 of the main program) are essentially identical and hence the explanation thereof is omitted.

The antenna terminal ANT may include a photoelectric converter and the transmission line may be an optical fiber.

As described hereinabove, according to the present embodiment, the copying machine and the attachment device have the microcomputers for carrying out the serial-to-parallel and parallel-to-serial data conversion so that the data can be transferred serially. In addition, the number of pins of connectors for coupling the microcomputers is very small and a highly reliable data transfer apparatus is provided. In addition, the present embodiment is of simple construction and readily applied to the existing copying machine.

Furthermore, since the switching of master and slave status as between the copying machine and the attachment device is readily carried out, they can be used as tranceivers having no distinction of transmitter and receiver. Since bilateral transmission is possible, a pair of microcomputers of the same function may be installed. Accordingly, an economical data transfer apparatus is provided.

When a bit error occurs in the data transfer, it is readily and correctly handled so that a highly reliable data transfer apparatus is provided.

Figure 20:
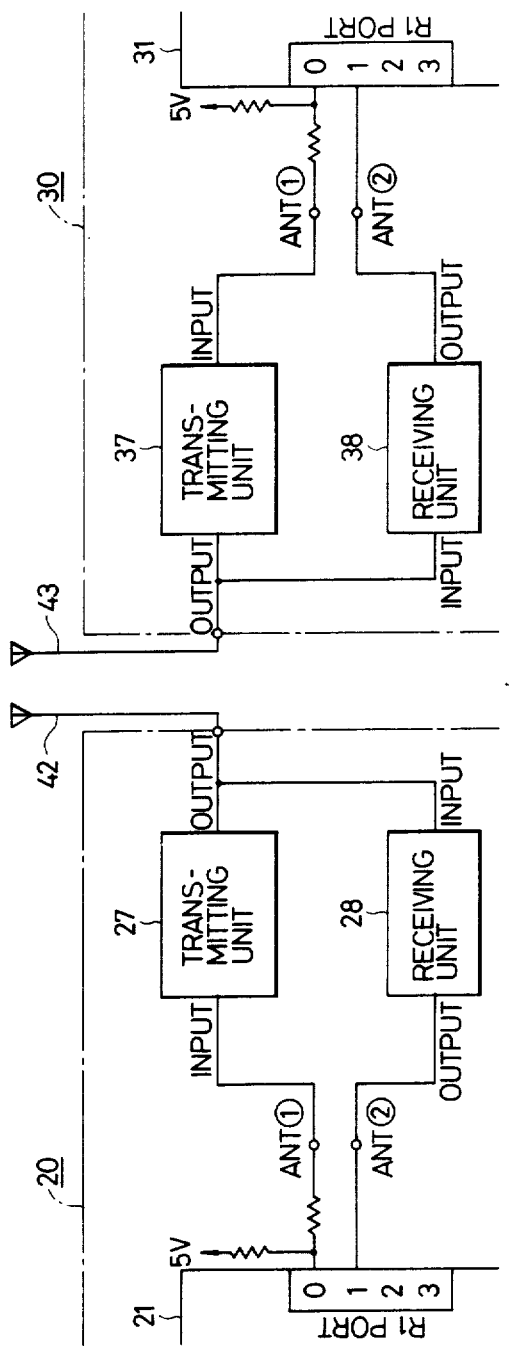
FIGS. 20 and 25 show partial circuit diagrams of other embodiments.

An embodiment which further reduces the data transfer media is shown in FIG. 20.

Figure 21:
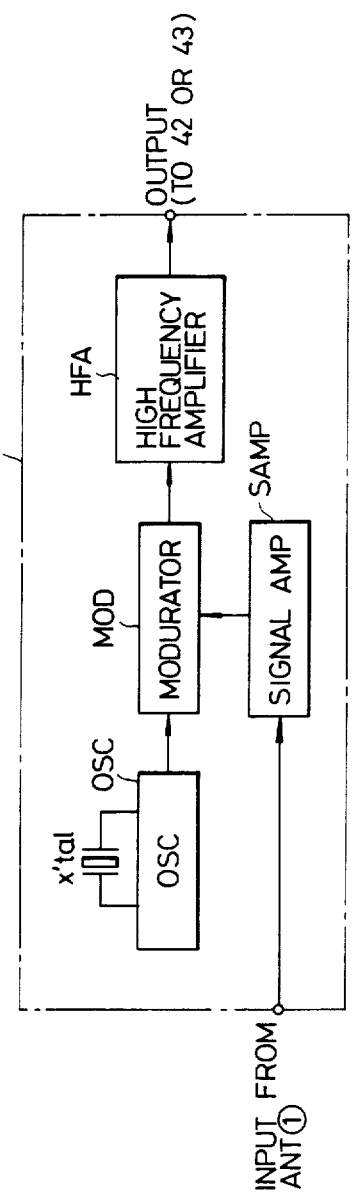
FIGS. 21, 23, 26 and 28 show other partial circuit diagrams of other embodiments.
Figure 22:
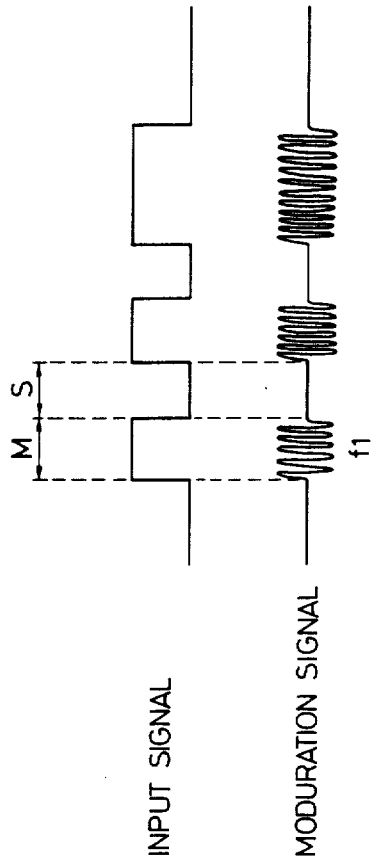
FIGS. 22 and 27 show transfer waveforms.

FIGS. 19 to 21 and FIG. 23 show configurations of main portions of a data transfer apparatus and FIG. 22 shows an output signal of the unit of FIG. 21.

Figure 19:
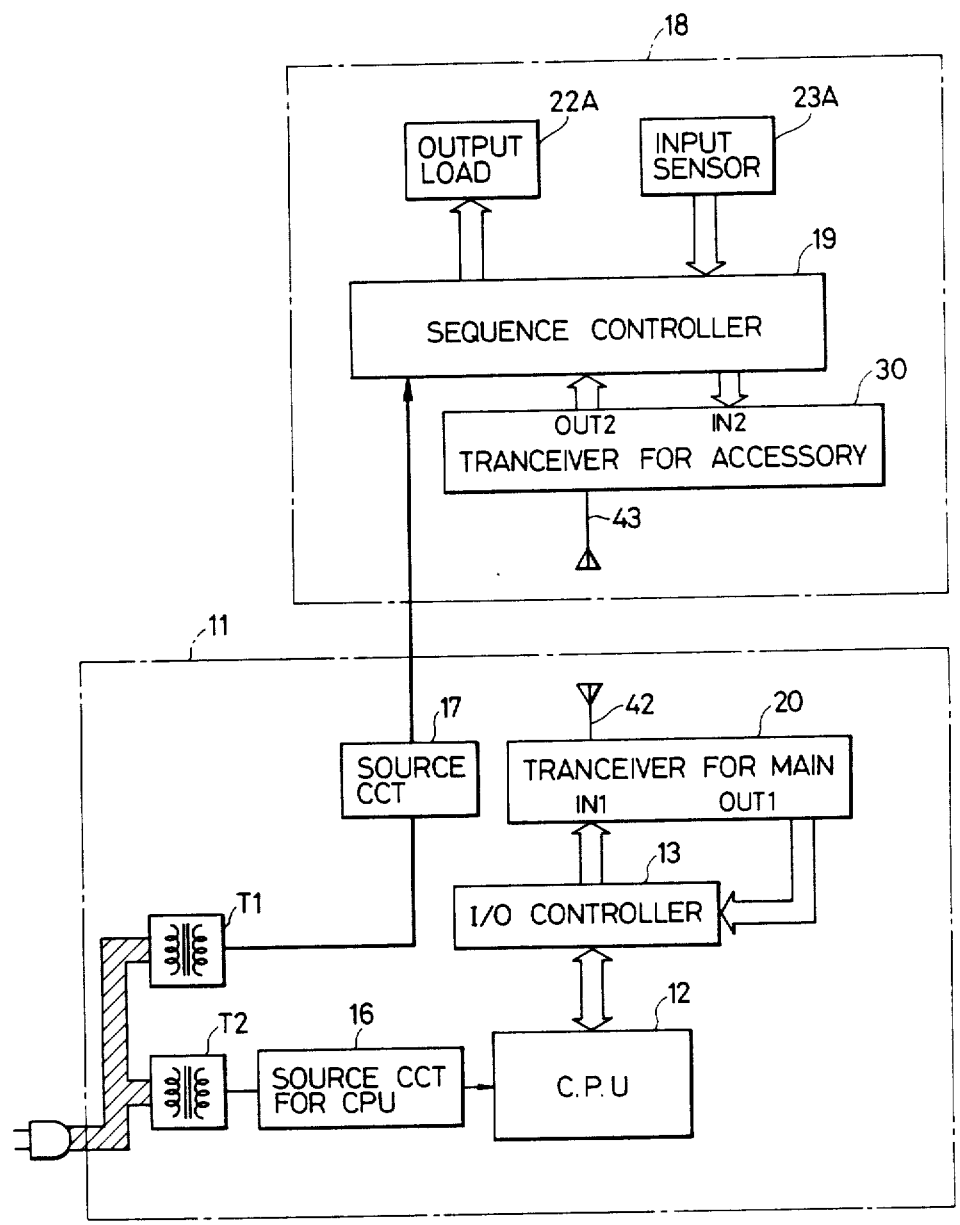
FIGS. 19, 24 and 29 show block diagrams of other embodiments.

Referring to FIGS. 19 and 20, numerals 27 and 37 denote transmitting units for modulating the serial data and numerals 28 and 38 denote receiving units for demodulating the serial data. As shown in FIGS. 21 and 22, the transmitting units 27 and 37 each comprise a high frequency output circuit for pulse-frequency modulating an input signal to produce a high frequency continuous wave (CW). It supplies the input signal to a signal amplifier (SAMP), a modulator (MOD) and a high frequency amplifier (HFA) serially and modulates it to the high frequency continuous wave (CW) with a carrier being present for a mark portion of the serial digital data and the carrier being absent for a space portion. OSC denotes an oscillator.

Figure 23:
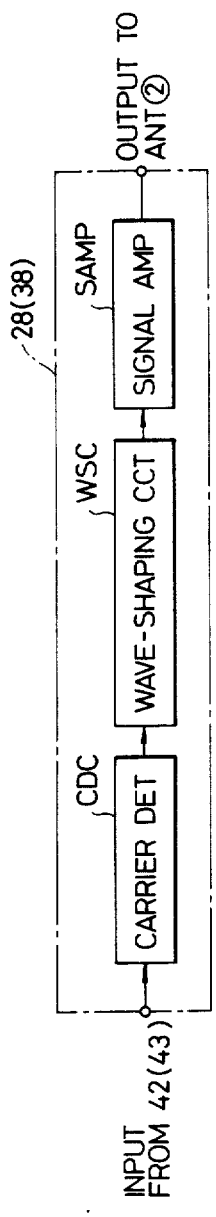

On the other hand, the receiving units 28 and 38 each comprise, as shown in FIG. 23, a demodulator for converting the high frequency continuous wave modulated by the transmitting unit 27 or 37 to digital data, and it has a carrier detector CDC, a wave shaper WSC and a signal amplifier SAMP. The other elements are identical to those of FIG. 3-1.

In FIG. 20, numeral 42 denotes an antenna for air transmission connected to the master transmitting unit 27, and numeral 43 denotes an antenna for air transmission connected to the slave transmitting unit 37. The high frequency output supplied from one of the transmitting units 27 and 37 is radiated to the air through the corresponding antenna 42 or 43 and the signal propagated through the air is absorbed by the other antenna 43 or 42 and supplied to the corresponding receiving unit 38 or 28.

The operation of the data transfer apparatus thus constructed is now explained. The data from the pin 0 of the port R1 of the master microcomputer 21 is supplied to the transmitting unit 27 through the antenna terminal ANT ①. The high frequency signal from the transmitting unit 27 is radiated to the air by the antenna 42.

The signal propagated through the air is absorbed by the slave antenna 43 and supplied to the slave receiving unit 38. The serial digital data demodulated by the receiving unit 38 is supplied to the pin 1 of the port R1 of the slave microcomputer 31.

In the present data transfer apparatus, when the data is supplied from the copying machine to the input terminal IN1 comprising the terminals P113–P114 of the transmitter/receiver 20, the data is amplified by the amplifiers 23 and 24 and the amplified data is read into the microcomputer 21 through the terminals of the ports R2, R3 and K. The data is then converted to a serial data, which is transmitted from the port R1 to the transmitter/receiver 30 through the antenna terminal ANT ①, the transmitting unit 27, the antenna 42 and the antenna 43. The transmitter/receiver 30 receives the serial data through the receiving unit 38 and the antenna terminal ANT ② and supplies it to the port R1 of the microcomputer 31, which in turn reconverts the serial data to a parallel data and supplies it to the amplifiers 33 and 34 through ports O and P. The amplifiers 33 and 34 amplify the parallel data and transfer the amplified data to the output terminal OUT2 comprising the terminals P201–P212.

The data transfer from the slave transmitter/receiver 30 to the master transmitter/receiver 20 is similarly carried out.

In the present embodiment, a wireless propagation antenna is used as means for radiating the modulated signal to the air although it is not limited thereto. For example, the transmitter/receiver may be a combination of an electromagnet and a Hall IC or a combination of a light emitting element and a photosensitive element.

As described hereinabove, according to the present embodiment, a signal cable and a coupling connector therefor used in the prior art apparatus can be omitted.

An embodiment of the data transfer apparatus in which data is superimposed on a signal cable connecting the copying machine and the attachment device so that the existing signal cable need not be exchanged when the number of signals increases is now explained.

Figure 25:
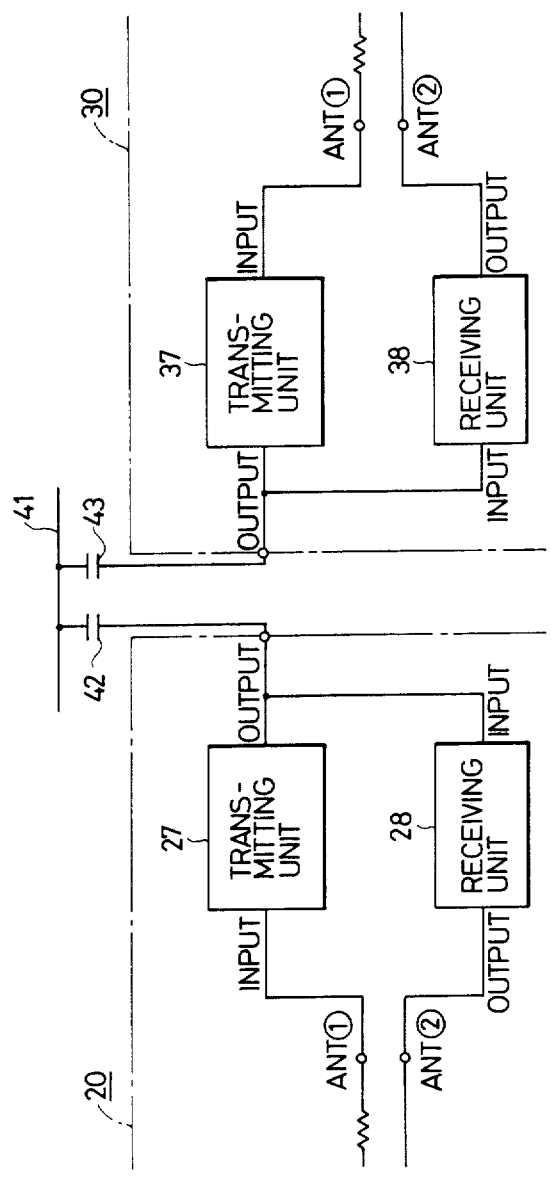
Figure 26:
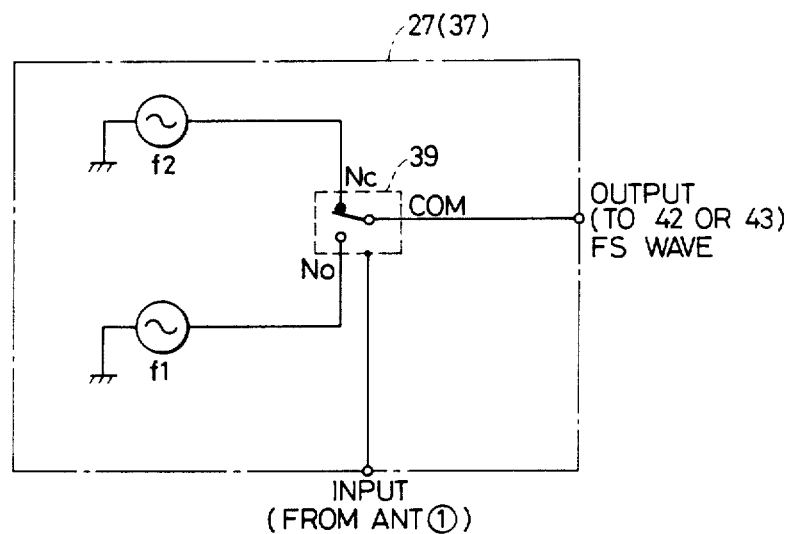
Figure 27:
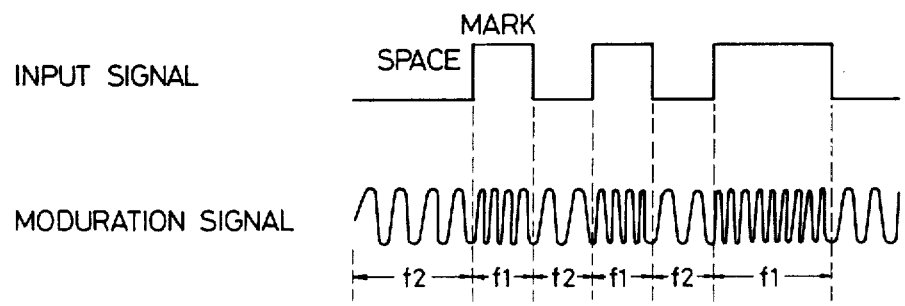
Figure 28:
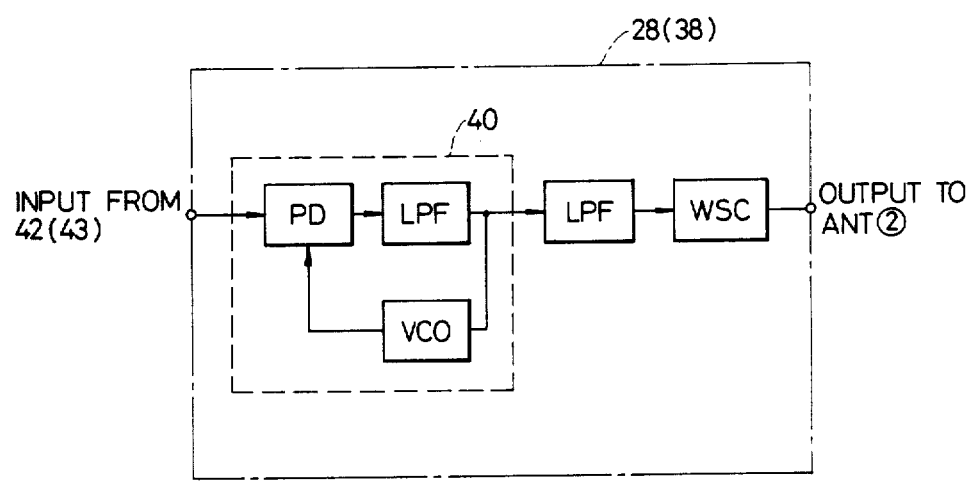

FIGS. 24 to 26 and 28 show the configuration of main portions of the data transfer apparatus in accordance with the present embodiment, and FIG. 27 shows an output signal of the unit of FIG. 26.

In FIG. 25, numerals 27 and 37 denote transmitting units for modulation, and numeral 28 and 38 denote receiving units for demodulation. As shown in FIGS. 26 and 27, the transmitting units 27 and 37 each comprise a FS modulator for frequency-shift modulating the input signal and it switches the frequencies f1 and f2 by a switch 39 depending on a mark portion and a space portion of the serial digital data in the input signal. On the other hand, the receiving units 28 and 38 each comprise, as shown in FIG. 27, an FS demodulator for converting the FS modulated input signal to a digital data, and it has a phase locked loop (PLL) 40 including a phase discriminator PD, a low-pass filter LPF and a voltage controlled oscillator VCO, a second low-pass filter LPF and a wave shaper WSC. The other elements are identical to those shown in FIG. 3-1.

Figure 24:
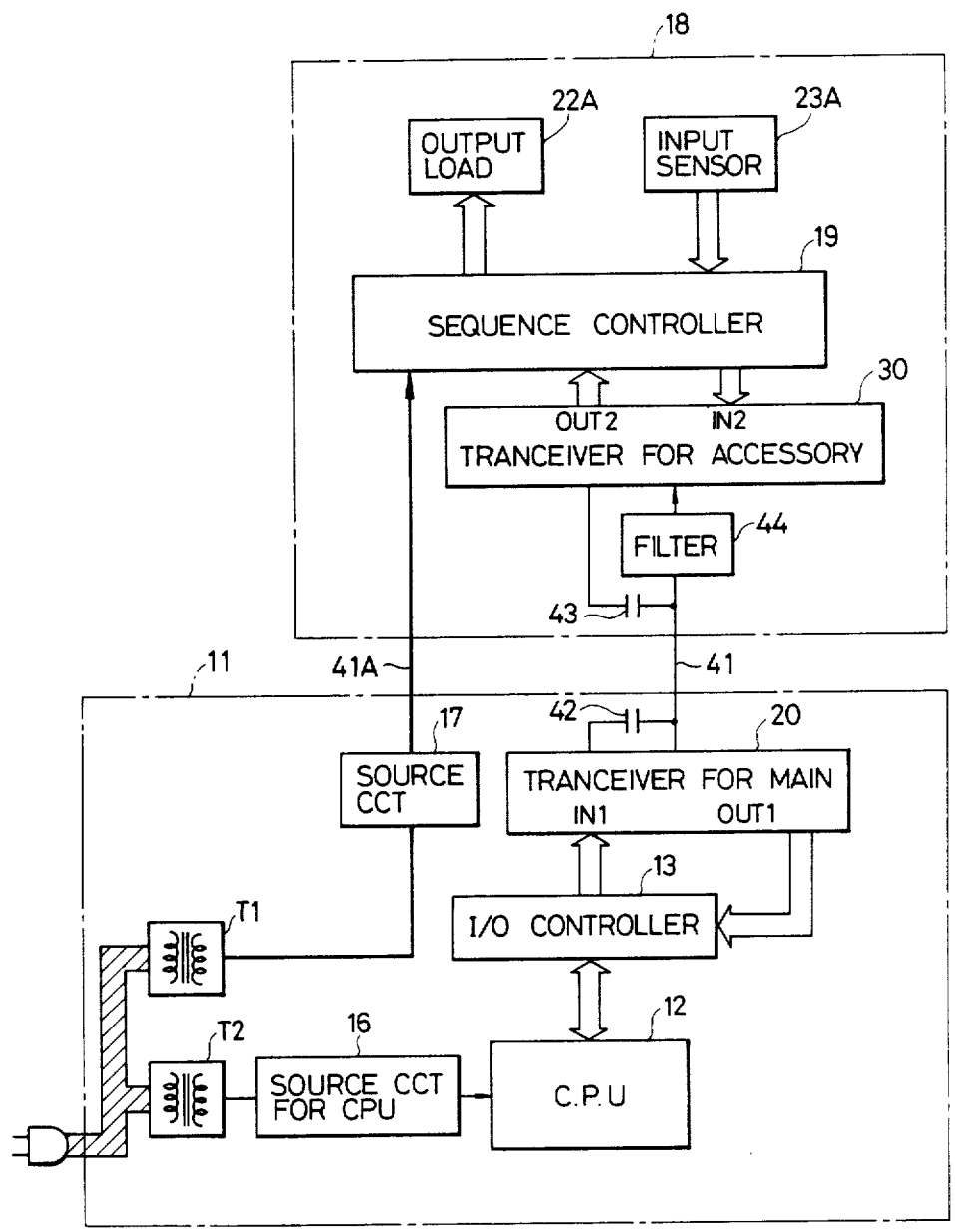

In FIG. 25, numeral 41 denotes a signal cable for connecting the copying machine 11 with the attachment device 18. The FS-modulated high frequency data is carried over the signal cable 41 to serially transfer the data. Numerals 42 and 43 denote coupling capacitors which high-frequency-couple the signal cable 41 with the transmitting units 27 and 37 and the receiving units 28 and 38. Numeral 44 denotes a high frequency elimination filter. As shown in FIG. 24, the high frequency component superimposed on the signal cable 41 is eliminated by the filter 44.

The operation of the data transfer apparatus thus constructed is now explained. The data from the pin 0 of the port R1 of the master microcomputer 21 is supplied to the transmitting unit 27 through the antenna terminal ANT ①. The high frequency component of the FS modulated s from the transmitting unit 27 is superimposed on the signal cable 41 through the capacitor 42. The high frequency component is then supplied to the slave receiving unit 38 through the signal cable 41 and the capacitor 43. The serial digital data demodulated by the receiving unit 38 is supplied to the pin 1 of the port R1 of the slave microcomputer 31.

In the present data transfer apparatus, when the data is supplied from the copying machine to the input terminal IN1 comprising the terminals P113–P124 of the transmitter/receiver 20, the data is amplified by the amplifiers 23 and 24, and the amplified data is read into the microcomputer 21 through the ports R2, R3 and K, and the microcomputer 21 converts it to serial data and transmits it to the transmitter/receiver 30 from the port R1 through the antenna terminal ANT ①, the transmitting unit 27, the coupling capacitor 42, the signal cable 41 and. the coupling capacitor 43. The transmitter/receiver 30 receives the serial data through the receiving unit 38 and the antenna terminal ANT ② and supplies it to the port R1 of the microcomputer 31, which in turn reconverts the serial data to parallel data and supplies it to the amplifiers 33 and 34 through the terminals of the ports O and P. The amplifiers 33 and 34 amplify the parallel data and supply the amplified data to the output terminal OUT2 comprising the terminals P201–P212.

The transmission of the data from the slave transmitter/receiver 30 to the master transmitter/receiver 20 is carried out in a similar manner. In this case, like the previous case, the microcomputer 31 carries out the parallel-to-serial data conversion and the microcomputer 21 carries out the serial-to-parallel data conversion. In this manner, the transmitter/receivers 20 and 30 can transmit the data bilaterally through the signal cable 41.

In the present embodiment, by the use of the FS modulation, the number of signals transmitted through the existing signal cable can be remarkably increased, and the existing cable need not be exchanged when the number of signals is to be increased in future. Since the construction is simple, it is readily applicable to the existing copying machine.

It is possible to replace the single wire signal cable by an optical fiber by converting the data to be transferred to a light signal.

Figure 29:
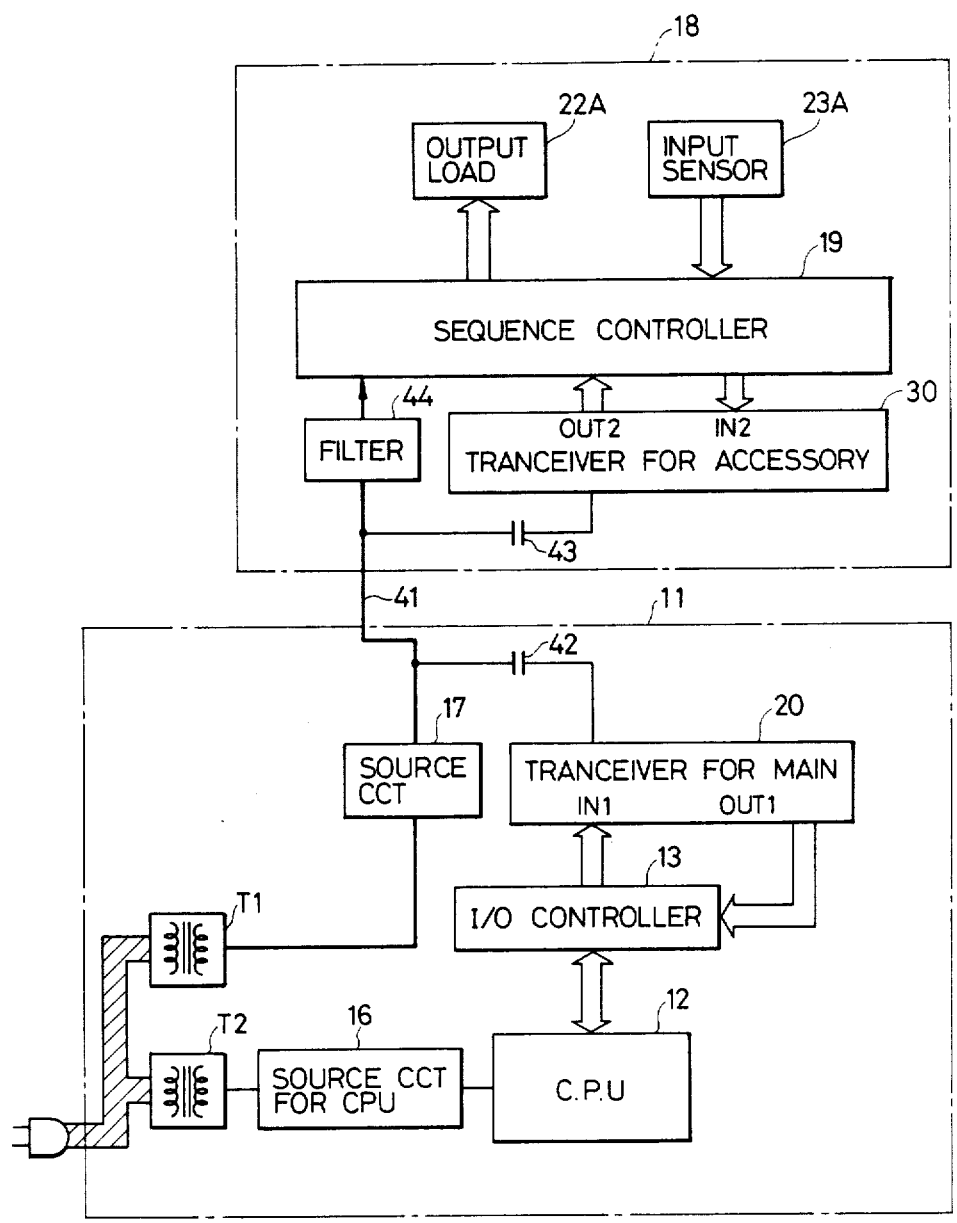

FIG. 29 shows an embodiment of the data transfer apparatus in which the signal cable is omitted by superimposing the data to a power supply line of a power supplied from the copying machine to the attachment device.

In FIGS. 25 and 29, numeral 41 denotes a power supply line of a power supplied from the copying machine 11 to the attachment device 18. The FS modulated high frequency data is superimposed on the power supply line 41 to serially transfer the data. Numerals 42 and 43 denote coupling capacitors which high-frequency-couple the power supply line 41 with the transmitting units 27 and 37 and the receiving units 28 and 38. Numeral 45 denotes a filter for eliminating a high frequency component. As shown in FIG. 3, the high frequency component superimposed on the power supply line 41 is eliminated by the filter 44 and then power is supplied to the sequence controller 19. The operation of the data transfer is same as that of FIG. 25.

In the present embodiment, the existing signal cable and the connectors therefor can be omitted and a highly reliable serial data transfer apparatus is provided.

What is claimed is:

1. A data transfer system in which a plurality of data transfer apparatuses are adapted for mutual exchange of data, each said apparatus comprising:

a computer for processing data, having on one chip a read only memory, a random access memory and an arithmetic logic unit, wherein said arithmetic logic unit processes the plural bits of serial data received through an input port means in accordance with a predetermined program stored in said read only memory, said read only memory stores a serial-to-parallel data conversion program and said arithmetic logic unit takes said plural bits of serial data to store the taken bits of serial data in said random access memory and produces plural bits of parallel data by reading out the bits stored in said random access memory;

communication means for receiving data to be processed by said computer from another of said apparatuses;

means for setting said apparatus to be a master apparatus or a slave apparatus relative to said other apparatus in data transfer;

means operable prior to the reception of the data to be processed from said other apparatus by way of said communication means, for discriminating a characteristic of data transmission by said other apparatus, if said one apparatus is set to be a slave apparatus; and means for controlling the data reception by said communication means in accordance with the characteristic discriminated by said discriminating means so as to render a data reception characteristic of said one apparatus compatible with the discriminated data transmission characteristic of said other apparatus.

2. A data processing apparatus according to claim 1, wherein said random access memory has a plurality of storage areas each corresponding to one of a plurality of output terminals of said output port means, and said arithmetic logic unit is adapted to store each bit of the data in a predetermined area of said random access memory and then read out the data stored in the areas of said random access memory correspondingly to each output terminal.

3. A data processing apparatus according to claim 8, wherein said input port means receives the plural bits of serial data through a transmission line.

4. A data transfer system according to claim 1, wherein said discriminating means is arranged to detect a parameter of a primary synchronizing signal transmitted to said data transfer apparatus from said other apparatus and wherein said controlling means is arranged to control data communication with said other apparatus in accordance with said parameter.

5. A data transfer apparatus according to claim 4, further comprising means for generating a return synchronizing signal for return transmission to said other apparatus, the parameter of said return synchronizing signal which corresponds with said detected parameter of said primary synchronizing signal being set according to said detected parameter.

6. A data transfer apparatus according to claim 4 or claim 5, wherein said detected parameter is the pulse period of a clock pulse train constituting said primary synchronizing signal and wherein said controlling means is arranged to synchronize data reception of multi-bit data signals of which the bit length corresponds with the pulse period of said primary synchronizing signal, in accordance with said detected pulse length thereof.

7. A data transfer system according to claim 1, wherein said discriminating means discriminates a data transmission speed of said other apparatus.

8. A data processing apparatus adapted to exchange data with another apparatus, comprising:
  input port means having a plurality of input terminals adapted to enter respective bits of data in parallel;
  a computer for processing having on one chip a read only memory, a random access memory and an arithmetic logic unit, wherein said arithmetic logic unit processes the bits of data entered in parallel through said input port means in accordance with a predetermined program stored in said read only memory, said read only memory stores a parallel-to-serial data conversion program, and said arithmetic logic unit takes said bits of parallel data into said computer to store the in-taken bits of parallel data in said random access memory and produces bits of serial data by reading out bits stored in said random access memory bit by bit, in accordance with said conversion program; and
  output means adapted to transmit the bits of serial data produced by said computer to said other apparatus;
  communication means for receiving data to be processed by said computer from said apparatus;
  means for setting said apparatus to be a master apparatus or a slave apparatus relative to said other apparatus in data transfer;
  means operable prior to the reception of the data to be processed from said other apparatus by way of said communication means, for discriminating a characteristic of data transmission by said other apparatus, if said one apparatus is set to be a slave apparatus; and
  means for controlling the data reception by said communication means in accordance with the characteristic discriminated by said discriminating means so as to render a data reception characteristic of said one apparatus compatible with the discriminated data transmission characteristic of said other apparatus.

9. A data processing apparatus according to claim 8, wherein said random access memory has a plurality of storage areas each corresponding to one of said plurality of input termials of said input port means, and said arithmetic logic unit is adapted to store each bit of the data in a predetermined area of said random access memory and then read out the data stored in the areas of said random access memory in a predetermined order.

10. A data processing apparatus according to claim 8, wherein said output means transmits the bits of serial data at a predetermined speed.

11. A data processing apparatus according to claim 8, wherein said output means transmits the bits of serial data through a transmission line.

* * * * *

UNITED STATES PATENT AND TRADEMARK OFFICE
CERTIFICATE OF CORRECTION

PATENT NO. : 4,747,071
DATED : May 24, 1988
INVENTOR(S) : YUKIO SATO

Page 1 of 4

It is certified that error appears in the above-identified patent and that said Letters Patent is hereby corrected as shown below:

IN THE DRAWINGS:

SHEET 2

FIG. 2, "SEQUENCE CONTROL" should read --SEQUENCE CONTROLLER--.

SHEET 19

FIG. 19, "TRANCEIVER" should read --TRANSCEIVER-- (both occurrences).

SHEET 21

FIG. 21, "MODURATOR" should read --MODULATOR--.
    FIG. 22, "MODURATION" should read --MODULATION--.

SHEET 23

FIG. 24, "TRANCEIVER" should read --TRANSCEIVER-- (both occurrences).

SHEET 24

FIG. 27, "MODURATION" should read --MODULATION--.

SHEET 26

FIG. 29, "TRANCEIVER" should read --TRANSCEIVER-- (both occurrences).

UNITED STATES PATENT AND TRADEMARK OFFICE
CERTIFICATE OF CORRECTION

PATENT NO. : 4,747,071

DATED : May 24, 1988

INVENTOR(S) : YUKIO SATO

It is certified that error appears in the above-identified patent and that said Letters Patent is hereby corrected as shown below:

COLUMN 1

Line 61, "an other" should read --another--.
    Line 64, "an other" should read --another--.
    Line 67, "a" should read --an-- and "micro- comput-" should read --microcomput- --.

COLUMN 2

Line 1, "an other" should read --another--.
    Line 4, "an other" should read --another--.
    Line 8, "an other" should read --another--.
    Line 11, "an other" should read --another--.
    Line 14, "an other" should read --another--.
    Line 24, "an" should read --a--.
    Line 66, "paper sensor 2" should read --paper sensor 23A--.

COLUMN 4

Line 23, "①" should read --⑤--.
    Line 27, "be even" should read --be an even--.

COLUMN 5

Line 38, "a" should be deleted.

COLUMN 6

Line 15, "falls" should read --sets--.

UNITED STATES PATENT AND TRADEMARK OFFICE
CERTIFICATE OF CORRECTION

PATENT NO. : 4,747,071

DATED : May 24, 1988

INVENTOR(S) : YUKIO SATO

Page 3 of 4

It is certified that error appears in the above-identified patent and that said Letters Patent is hereby corrected as shown below:

COLUMN 8

Line 58, ""CTR CLR"" should read --"CNT CLR"--.

COLUMN 9

Line 22, "If," should read --If--.
    Line 52, "(see." should read --(see--.

COLUMN 10

Line 31, "been" should be deleted.
    Line 34, "fore" should read --for--.

COLUMN 11

Line 7, "data is" should read --data in--.
    Line 36, "tranceivers" should read --transceivers--.

COLUMN 12

Line 66, "numeral" should read --numerals--.
    Line 68, "a" should read --an--.

COLUMN 13

Line 29, "FS modulated s" should read --FS-modulated signal--.

UNITED STATES PATENT AND TRADEMARK OFFICE
CERTIFICATE OF CORRECTION

PATENT NO. : 4,747,071

DATED : May 24, 1988

INVENTOR(S) : YUKIO SATO

It is certified that error appears in the above-identified patent and that said Letters Patent is hereby corrected as shown below:

COLUMN 14

Line 14, "FS modu-" should read --FS-modu- --.
    Line 65, "apparatus" should read --system--.

COLUMN 15

Line 6, "apparatus" should read --system-- and "claim 8" should read --claim 1--.
    Line 16, "apparatus" should read --system--.
    Line 23, "apparatus" should read --system--.

COLUMN 16

Line 13, "said apparatus;" should read --said other apparatus;--.

Signed and Sealed this

Thirtieth Day of April, 1991

*Attest:*

HARRY F. MANBECK, JR.

*Attesting Officer*    *Commissioner of Patents and Trademarks*